(12) United States Patent
Greenwood et al.

(10) Patent No.: US 8,695,734 B2
(45) Date of Patent: Apr. 15, 2014

(54) DRIVING AND STEERING OF MOTOR VEHICLES

(75) Inventors: Christopher John Greenwood, Leyland (GB); Ian David Cornwell, Penwortham (GB)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 13/449,174

(22) Filed: Apr. 17, 2012

(65) Prior Publication Data

US 2012/0298429 A1    Nov. 29, 2012

Related U.S. Application Data

(63) Continuation of application No. 12/097,875, filed as application No. PCT/EP2006/065467 on Aug. 18, 2006, now Pat. No. 8,157,030.

(30) Foreign Application Priority Data

Aug. 22, 2005  (GB) .................................. 0517200.2

(51) Int. Cl.
    *B62D 11/06*    (2006.01)
(52) U.S. Cl.
    USPC ........................................................ 180/6.48
(58) Field of Classification Search
    USPC .................................................. 180/6.48, 6.5
    See application file for complete search history.

(56) References Cited

U.S. PATENT DOCUMENTS

| | | | |
|---|---|---|---|
| 1,794,241 A | 2/1931 | Patterson .......................... | 74/334 |
| 3,362,493 A | 1/1968 | Davis et al. .................. | 180/6.32 |
| 3,398,819 A | 8/1968 | Ruhl et al. ..................... | 192/221 |
| 3,429,392 A | 2/1969 | Ryskamp ........................ | 180/6.3 |
| 3,572,033 A | 3/1971 | Tolley .............................. | 60/427 |
| 3,581,682 A | 6/1971 | Kontranowski ................. | 180/55 |
| 3,712,403 A * | 1/1973 | Pakosh .......................... | 180/6.48 |
| 3,865,208 A | 2/1975 | Crawshay et al. ............ | 180/6.48 |
| 3,900,075 A | 8/1975 | Chichester et al. ............ | 180/6.3 |

(Continued)

FOREIGN PATENT DOCUMENTS

| | | |
|---|---|---|
| EP | 0 754 613 | 1/1997 |
| EP | 1 000 793 | 5/2000 |

(Continued)

OTHER PUBLICATIONS

"SST15, SST16, and SST18 Spin-Steer Technology™ lawn tractors," Litho in U.S.A., Apr. 2003.

(Continued)

*Primary Examiner* — Kevin Hurley
(74) *Attorney, Agent, or Firm* — Fulbright & Jaworski LLP

(57) ABSTRACT

An arrangement and a method are disclosed for driving and steering an engine driven vehicle of the type m which left and right hand wheels 120L, 120R are respectively driven from the engine through left and right hand transmissions 122L, 122R and a steering effect is exerted by changing the ratio of one transmission relative to the other. According to the invention a follower is operatively coupled to at least one of the transmissions and is movable circumferentially about an axis by means of a driver actuable steering control to change the relative speeds of the two driven wheels and radially with respect to the axis by means of a driver actuable speed control to increase/decrease the speeds of the two driven wheels in unison.

14 Claims, 16 Drawing Sheets

(56) References Cited

U.S. PATENT DOCUMENTS

| | | | | |
|---|---|---|---|---|
| 3,913,695 | A | 10/1975 | Holdenried et al. | 180/6.48 |
| 4,100,738 | A * | 7/1978 | Seaberg et al. | 60/327 |
| 4,339,966 | A | 7/1982 | Kraus | 74/650 |
| 4,399,882 | A | 8/1983 | O'Neill et al. | 180/6.48 |
| 4,572,310 | A | 2/1986 | Peter | 180/6.24 |
| 4,852,679 | A | 8/1989 | Fry | 180/234 |
| 4,875,536 | A | 10/1989 | Saur et al. | 180/6.32 |
| 4,882,947 | A | 11/1989 | Barnard | 475/23 |
| 4,969,533 | A | 11/1990 | Holm et al. | 180/273 |
| 5,042,238 | A | 8/1991 | White, III et al. | 56/11.8 |
| 5,078,222 | A | 1/1992 | Hauser et al. | 180/6.48 |
| RE34,057 | E | 9/1992 | Middlesworth | 180/6.2 |
| 5,238,267 | A * | 8/1993 | Hutchison et al. | 280/781 |
| 5,263,901 | A | 11/1993 | Kawakami et al. | 180/6.48 |
| 5,288,091 | A | 2/1994 | Deschamps | 180/409 |
| 5,529,135 | A | 6/1996 | Wenzel et al. | 180/6.24 |
| 5,766,105 | A | 6/1998 | Fellows et al. | 474/18 |
| 5,848,520 | A | 12/1998 | Arfstrom et al. | 56/11.4 |
| 5,850,886 | A | 12/1998 | Kouno et al. | 180/6.24 |
| 5,941,334 | A | 8/1999 | Inagaki et al. | 180/242 |
| 6,092,617 | A * | 7/2000 | White et al. | 180/338 |
| 6,129,164 | A | 10/2000 | Teal et al. | 180/6.2 |
| 6,152,248 | A | 11/2000 | Hidaka et al. | 180/6.38 |
| 6,196,342 | B1 | 3/2001 | Teal et al. | 180/6.2 |
| 6,230,829 | B1 | 5/2001 | Martin et al. | 180/6.3 |
| 6,256,357 | B1 | 7/2001 | Oshima | 375/261 |
| 6,257,357 | B1 | 7/2001 | Teal et al. | 180/6.2 |
| 6,301,864 | B1 | 10/2001 | Damie et al. | 56/11.3 |
| 6,408,960 | B1 | 6/2002 | Hidaka et al. | 180/6.38 |
| 6,434,919 | B2 | 8/2002 | Schick | 56/15.9 |
| 6,447,419 | B1 | 9/2002 | Irikura et al. | 475/24 |
| 6,456,925 | B1 | 9/2002 | Romig | 701/93 |
| 6,523,635 | B1 * | 2/2003 | Johnston et al. | 180/307 |
| 6,540,633 | B1 * | 4/2003 | Hasegawa et al. | 475/24 |
| 6,554,085 | B2 | 4/2003 | Hasegawa et al. | 180/6.26 |
| 6,601,663 | B2 | 8/2003 | Hauser | 180/6.3 |
| 6,659,216 | B2 | 12/2003 | Irikura et al. | 180/307 |
| 6,672,411 | B1 * | 1/2004 | Mouser | 180/6.32 |
| 6,688,090 | B2 | 2/2004 | Velke et al. | 56/14.7 |
| 6,725,954 | B1 | 4/2004 | Keane et al. | 180/6.48 |
| 6,729,115 | B2 | 5/2004 | Bartel | 56/11.3 |
| 6,771,034 | B2 | 8/2004 | Reile et al. | 318/139 |
| 6,808,032 | B2 | 10/2004 | Wuertz et al. | 180/6.48 |
| 6,830,115 | B2 | 12/2004 | Irikura | 180/6.24 |
| 6,874,305 | B2 * | 4/2005 | Ishimori | 56/10.8 |
| 6,904,985 | B2 | 6/2005 | Ferree et al. | 180/6.32 |
| 6,905,985 | B1 | 6/2005 | Schindzielorz et al. | 442/65 |
| 6,912,831 | B2 | 7/2005 | Velke et al. | 56/10.9 |
| 6,921,109 | B2 | 7/2005 | Hutchison et al. | 280/771 |
| 6,945,353 | B2 | 9/2005 | Bishop | 180/446 |
| 6,951,259 | B2 | 10/2005 | Irikura | 180/6.3 |
| 6,962,219 | B2 * | 11/2005 | Hauser | 180/6.34 |
| 7,004,268 | B2 | 2/2006 | Irikura | 180/6.3 |
| 7,017,327 | B2 | 3/2006 | Hunt et al. | 56/14.7 |
| 7,059,433 | B2 | 6/2006 | Hasegawa et al. | 180/6.2 |
| 7,108,096 | B1 | 9/2006 | Oxley et al. | 180/170 |
| 7,237,629 | B1 | 7/2007 | Bland et al. | 180/6.24 |
| 7,347,434 | B2 | 3/2008 | Lewis et al. | 280/99 |
| 7,395,972 | B2 | 7/2008 | Ooishi et al. | 192/99 S |
| 7,431,123 | B2 | 10/2008 | Irikura et al. | 180/307 |
| 7,533,892 | B2 | 5/2009 | Schena et al. | 280/47.11 |
| 7,914,022 | B2 | 3/2011 | Ruebusch et al. | 280/93.502 |
| 7,992,659 | B2 | 8/2011 | Schaedler et al. | 180/6.24 |
| 2002/0092685 | A1 | 7/2002 | Hauser | 180/6.3 |
| 2002/0108800 | A1 | 8/2002 | Irikura et al. | 180/307 |
| 2002/0113564 | A1 | 8/2002 | Reile et al. | 318/139 |
| 2003/0019682 | A1 | 1/2003 | Schaedler et al. | 180/308 |
| 2003/0102171 | A1 | 6/2003 | Hauser | 180/6.2 |
| 2003/0106725 | A1 | 6/2003 | Irikura | 180/6.26 |
| 2003/0213625 | A1 | 11/2003 | Okada et al. | 180/6.2 |
| 2004/0040779 | A1 | 3/2004 | Bishop | 180/443 |
| 2004/0144590 | A1 | 7/2004 | Fluent et al. | 180/326 |
| 2004/0245029 | A1 | 12/2004 | Irikura | 180/6.24 |
| 2005/0003919 | A1 | 1/2005 | Hasegawa et al. | 475/83 |
| 2005/0023049 | A1 | 2/2005 | Ferree et al. | 180/6.3 |
| 2005/0145421 | A1 | 7/2005 | Ishimori | 180/6.32 |
| 2005/0209564 | A1 | 9/2005 | Bonner et al. | 604/173 |
| 2006/0278446 | A1 | 12/2006 | Oxley et al. | 180/6.24 |
| 2007/0144796 | A1 | 6/2007 | Schaedler et al. | 180/6.24 |
| 2008/0136134 | A1 | 6/2008 | McCoid et al. | 280/93.502 |
| 2008/0184687 | A1 | 8/2008 | Scherbring et al. | 56/10.1 |
| 2008/0217092 | A1 | 9/2008 | Ruebusch et al. | 180/338 |
| 2009/0188728 | A1 | 7/2009 | Osborne | 180/6.24 |
| 2009/0194965 | A1 | 8/2009 | Boston | 280/124.136 |

FOREIGN PATENT DOCUMENTS

| | | |
|---|---|---|
| EP | 1 186 459 | 3/2002 |
| GB | 2015666 | 9/1979 |
| GB | 2119328 | 4/1982 |
| GB | 2303829 | 3/1997 |
| WO | WO 2003/100295 | 12/2003 |
| WO | WO 2008/060169 | 5/2008 |

OTHER PUBLICATIONS

European Office Action, issued in European Application No. 06788098.9, mailed Oct. 12, 2009.

European Office Communication issued in Application No. 06 792 907.5—1264, dated Feb. 2, 2009.

European Office Communication issued in Application No. 06 792 905.9—1264, dated Mar. 13, 2009.

Hidaka, "Development of forced differential steering control system," *Automation Technology for Off-Road Equipment, Proceeding of the Oct. 7-8, 2001 Conference, Kyoto, Japan*, Oct. 7, 2004.

New Zealand Examination Report, issued in Application No. 566485, mailed Sep. 24, 2009.

New Zealand Examination Report, issued in Int. App. No. 566486, mailed Sep. 29, 2009.

Notice of Allowance issued in U.S. Appl. No. 11/269,899, dated Apr. 15, 2011.

Notice of Allowance issued in U.S. Appl. No. 11/490,881, dated Oct. 27, 2010.

Notice of Allowance issued in U.S. Appl. No. 11/490,881, dated Apr. 5, 2011.

Notice of Allowance issued in U.S. Appl. No. 11/874,130, dated Nov. 29, 2010.

Notice of Allowance issued in U.S. Appl. No. 12/055,668, dated Nov. 14, 2011.

Office Action, in U.S. Appl. No. 11/490,881, mailed Feb. 19, 2010.

Office Communication issued in U.S. Appl. No. 11/269,899, dated Feb. 6, 2007.

Office Communication issued in U.S. Appl. No. 11/269,899, dated Nov. 19, 2007.

Office Communication issued in U.S. Appl. No. 11/269,899, dated Apr. 1, 2009.

Office Communication issued in U.S. Appl. No. 11/490,881, dated Mar. 13, 2009.

Office Communication issued in U.S. Appl. No. 11/490,881, dated Jul. 2, 2009.

Office Communication issued in European Patent Application No. 06788098.9, dated Feb. 24, 2011.

Office Communication issued in European Patent Application No. 06792907.5, dated Feb. 19, 2010.

Office Communication issued in European Patent Application No. 06792905.9, dated May 13, 2009.

Office Communication issued in European Patent Application No. 06792905.9, dated Jul. 28, 2010.

Office Communication issued in European Patent Application No. 06792907.5, dated Apr. 19, 2010.

Office Communication issued in Mexican Patent Application No. MX/a/2008/001022, dated Apr. 27, 2011.

Office Communication issued in U.S. Appl. No. 13/081,482, dated Sep. 26, 2011.

Office Communication issued in U.S. Appl. No. 12/483,825, dated Jun. 22, 2011.

Office Communication issued in U.S. Appl. No. 11/874,130, dated Jan. 22, 2010.

(56) References Cited

OTHER PUBLICATIONS

Office Communication issued in U.S. Appl. No. 11/874,130, dated Aug. 18, 2010.
Office Communication issued in U.S. Appl. No. 13/051,711, dated Aug. 18, 2011.
Office Communication issued in U.S. Appl. No. 12/055,668, dated May 25, 2011.
Office Communication issued in U.S. Appl. No. 11/269,899, dated Jun. 15, 2010.
PCT International Preliminary Report on Patentability issued in International Patent Application No. PCT/US2007/081683, dated Apr. 30, 2009.
PCT International Preliminary Report on Patentability issued in International Patent Application No. PCT/US2009/038404, dated Jun. 30, 2010.
PCT International Preliminary Report on Patentability, issued in International Application No. PCT/EP2006/065464, dated Feb. 26, 2008.
PCT International Search Report and Written Opinion issued in International Patent Application No. PCT/US2007/081683, dated Apr. 30, 2008.
PCT International Search Report and Written Opinion issued in International Patent Application No. PCT/EP2006/065467, dated Dec. 15, 2006.
PCT International Search Report and Written Opinion issued in International application No. PCT/EP2006/065464, dated Oct. 17, 2006.
PCT International Search Report and Written Opinion, in Int. App. No. PCT/US2006/28357, mailed Aug. 8, 2007.
PCT International Search Report and Written Opinion, issued in Application No. PCT/US2009/038404, mailed Jan. 8, 2010.
Response to Apr. 1, 2009 Office Action, submitted in U.S. Appl. No. 11/269,899, dated Oct. 1, 2009.
Response to Feb. 6, 2007 Office Communication, U.S. Appl. No. 11/269,899, submitted Aug. 6, 2007.
Response to Jul. 2, 2009 Office Action, submitted in U.S. Appl. No. 11/490,881, dated Sep. 24, 2009.
Response to Nov. 19, 2007 Office Communication, U.S. Appl. No. 11/269,899, submitted Dec. 19, 2007.
Response to Office Action, in European App. No. 06792905.9, dated Oct. 30, 2009.
Response to Office Action, in European App. No. 06792907.5, dated Aug. 27, 2009.
Response to Office Communication issued in U.S. Appl. No. 11/490,881, submitted Apr. 13, 2009.
Response to Office Communication submitted in European Patent Application No. 06792907.5, dated Feb. 15, 2011.
Response to Office Communication submitted in International Patent Application No. PCT/US2009/038404, dated Apr. 6, 2010.
Response to Office Communication submitted in U.S. Appl. No. 13/081,482, dated Oct. 26, 2011.
Response to Office Communication submitted in U.S. Appl. No. 11/874,130, dated May 24, 2010.
Response to Office Communication submitted in U.S. Appl. No. 11/874,130, dated Nov. 10, 2010.
Response to Office Communication submitted in U.S. Appl. No. 12/055,668, dated Oct. 25, 2011.
Response to Office Communication submitted in European Patent Application No. 06788098.9, dated Jul. 30, 2010.
Response to Office Communication submitted in European Patent Application No. 06792905.9, dated Jan. 31, 2011.
Response to Office Communication submitted in U.S. Appl. No. 11/269,899, dated Nov. 8, 2010.
Response to Office Communication submitted in U.S. Appl. No. 11/490,881, dated Jul. 22, 2010.
Search Report issued in Great Britain Patent Application No. GB0517200.2, dated Dec. 22, 2005.
Search Report issued in Great Britain Patent Application No. GB0517201.0, dated Dec. 23, 2005.
Supplementary European Search Report, issued in Int. App. No. EP 06 78 8098, mailed Jul. 14, 2009.

* cited by examiner

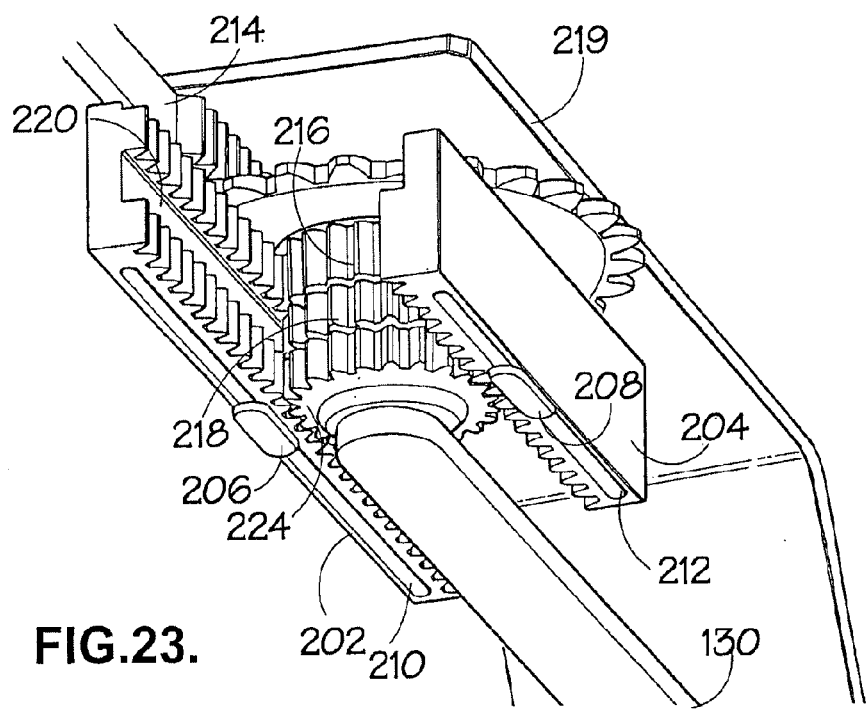
FIG.23.
FIG.24.
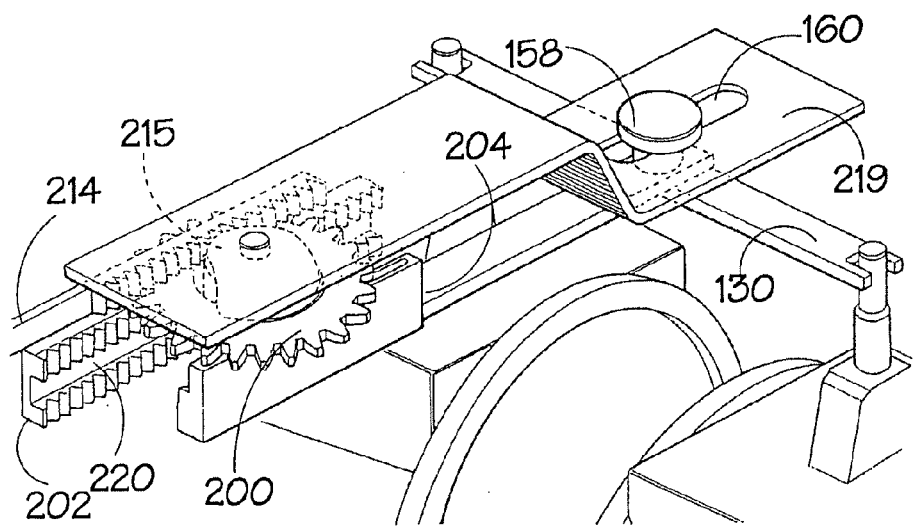

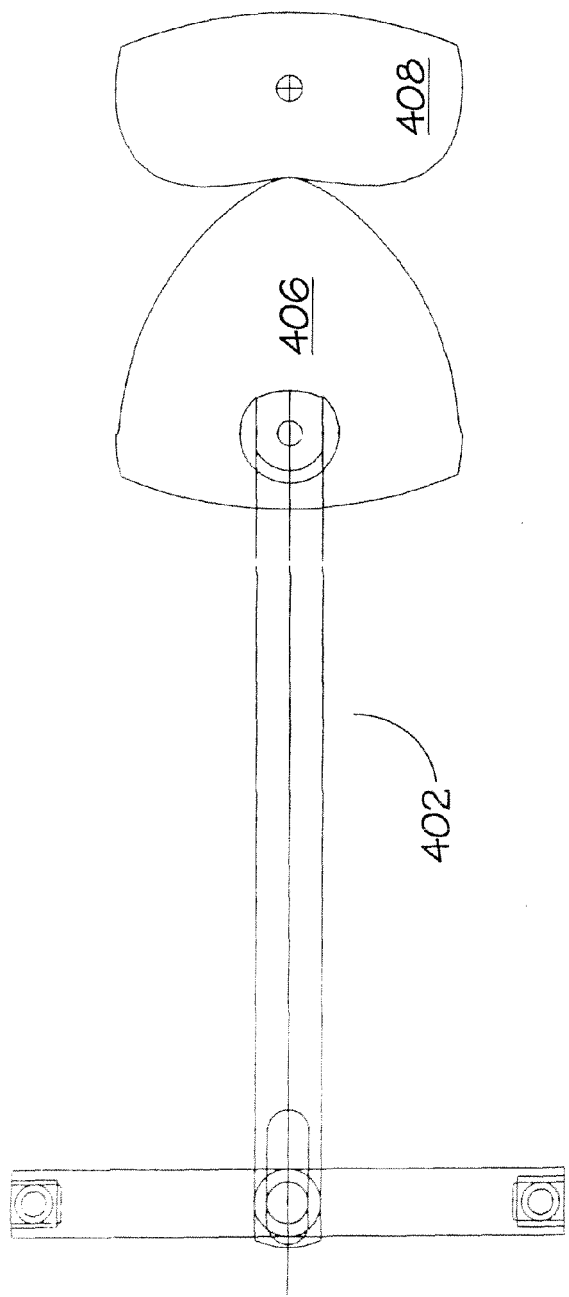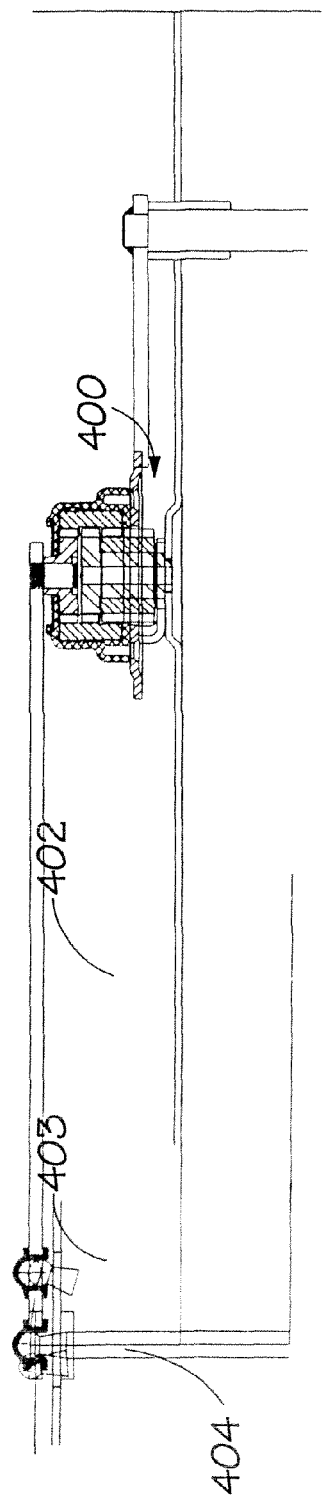

DRIVING AND STEERING OF MOTOR VEHICLES

CROSS-REFERENCE TO RELATED APPLICATIONS

This application is a continuation of U.S. patent application Ser. No. 12/097,875 filed Jun. 17, 2008 and now U.S. Pat. No. 8,157,030, which is national phase application under 35 U.S.C. §371 of International Application No. PCT/EP2006/065467 filed Aug. 18, 2006, which claims priority to Great Britain Application No. 0517200.2 filed Aug. 22, 2005. The entire text of each of the above-referenced applications is specifically incorporated by reference without disclaimer.

The present invention is concerned with arrangements for driving and steering motor vehicles, of the type in which vehicle wheels on the left and right hand sides of the vehicle are driven at different speeds in accordance with a desired vehicle turning radius.

Vehicles can be steered by controlling the relative speeds of driven wheels on opposite sides of the vehicle. Track-laying vehicles such as tanks are of course steered in this way (note in this regard that although, for the sake of brevity, reference will be made throughout to vehicle "wheels", this should be understood to encompass vehicles of track-laying type, wherein the "wheels" in question are pinions on which the tracks are carried) but so too are various types of vehicle used in construction, agriculture and horticulture, including for example ride-on lawnmowers. The principle is simple. If the wheel on one side of the vehicle is driven faster than the wheel on the other side, then the vehicle turns, with the slower moving wheel being on the inside of the turn. The wheel on the inside of the turn may be stationary, or may even be driven in the opposite direction from the other wheel. In the extreme case where the two wheels are driven at equal and opposite speeds, the vehicle can be caused to spin about its centre.

Where the vehicle has steerable wheels, such as the front wheels of a conventional tractor or ride-on lawnmower, the necessary steering effect may be achieved solely by control of driven wheel speed, with the steerable wheels being arranged as castors to follow the radius of turn determined by the driven wheels. Alternatively the steerable wheels may be positively controlled (e.g. through a conventional rack and pinion steering system) to produce the desired radius of turn, while the relative speeds of the driven wheels are set to produce the same radius. Compared with the alternative of guiding the vehicle by means of the steerable wheels only, this arrangement has the advantage of allowing the vehicle to turn very tightly and even to spin on the spot.

One way to achieve the necessary control over the speed and direction of rotation of the driven vehicle wheels involves the use of one engine but two essentially independent continuously variable transmissions ("CVTs"), through which the engine drives the left and right hand vehicle wheels respectively. In the case of small horticultural vehicles such as ride-on lawnmowers, continuously variable transmissions of hydrostatic type have been used in this role. The applicant now proposes to substitute infinitely variable transmissions of rolling-traction, toroidal-race type, but the principles involved in vehicle steering are common to both and the present invention is potentially applicable to either of these types of transmission, or indeed to others. Hydrostatic transmissions (well known to those skilled in the art) are also suitable, as are other types of mechanical CVT. An alternative way to achieve the necessary independent control over the speed of the driven vehicle wheels is to use two separate rotary drivers coupled to respective wheels and providing independently variable speeds. For example two separate electric motors coupled to the respective wheels through respective fixed ratio gearing could be used in this role.

The present invention is concerned with the manner in which control over such an arrangement is to be exercised. One known arrangement represented in FIG. 1 comprises left and right hand control levers 2L, 2R movable by the driver, controlling respective hydrostatic type CVTs 8L, 8R. The drive ratio applied to left and right hand vehicle wheels is controlled by the position of the corresponding lever and is variable from maximum forward ratio, through a neutral ratio, referred to herein as "geared neutral", at which wheel speed is zero, to maximum reverse. Note that throughout this document, drive ratio will be defined as output (wheel-side) speed divided by input (engine-side) speed, so that at geared neutral the drive ratio is zero. A difference in the position of the levers 2L, 2R produces a turn. Thus in FIG. 1a left hand lever 2L has been advanced further than right hand lever 2R. The left hand wheel is thus driven faster than the right, and a right turn results. Steerable front wheels 4L, 4R are correspondingly inclined.

In geared neutral, the engine is not physically de-coupled from the wheels (as by a clutch) but instead the transmission effectively provides infinite speed reduction, so that the relevant wheel is stationary despite rotation of the engine/transmission input. Hydrostatic transmissions can achieve this state. Numerous transmissions utilising a ratio varying-device ("variator") in conjunction with an epicyclic shunt gear to provide a geared neutral facility are described in Torotrak (Development) Ltd.'s portfolio of patents. Recent examples include International Application PCT/GB03/00332, published under WO 03/064892, and International Application PCT/GB03/02332, published under WO 03/100295, but the principle has been known for many years.

The known steering arrangement is widely used and successful, but can create problems for some drivers. Consider what happens if the levers, starting from the positions represented in FIG. 1a, are subsequently drawn backwards through identical distances by the driver, as represented in FIG. 1b. The right-hand wheel is now driven faster, in reverse, than the left. The vehicle changes from going forward and turning right (FIG. 1a) to reversing and turning left (FIG. 1b) even though the displacement of one lever relative to the other has not changed. This is counter-intuitive to some drivers.

In accordance with a first aspect of the present invention, there is an arrangement for driving and steering a motorised vehicle, the arrangement comprising a right hand drive arrangement for driving a right hand vehicle wheel at a speed which is continuously variable through a range including forward and reverse speeds, a left hand drive arrangement for driving a left hand vehicle wheel at a speed which is continuously variable through a range including forward and reverse speeds, a driver actuable speed control, and a driver actuable steering control, wherein both the left and right hand drive arrangements are controlled, in dependence upon driver inputs, by means of the speed and steering controls acting either through a common mechanism, or through two mechanisms associated with the respective drive arrangements, comprising in either case a guide defining a guide path which is rotatable about an axis by means of the steering control a mechanical follower which is movable back and forth along the guide path by means of the speed control, and a coupling between the follower and the drive arrangement(s), through which the follower's position influences vehicle wheel speed, whereby movement of the speed control in a first direction causes an increase in the speed of both the left and the right vehicle wheels, movement of the speed control in a second direction opposite to the first causes a decrease in the speed of both the left and the right vehicle wheels, so that vehicle speed is controllable by means of the speed control, and movement of the steering control causes a
change in the speed of one of the left and right vehicle wheels relative to the speed of the other, to provide for vehicle steering.

Rotary drive may be provided by an internal combustion engine but may be from a different type of rotary driver such as single or dualelectric motor(s) or an external combustion engine. The terms "right hand drive arrangement" and "left hand drive arrangement" refer to the fact that the arrangements in question are coupled to the right and left hand wheels respectively, and do not necessarily denote the relative spatial positions of the arrangements, nor is their physical construction necessarily wholly separate.

In accordance with a second aspect of the present invention, there a method of transmission control in a motor vehicle having
a right hand drive arrangement for driving a right hand vehicle wheel at a speed which is continuously variable through a range including forward and reverse,
a left hand drive arrangement for driving a left hand vehicle wheel at a speed which is continuously variable through a range including forward and reverse,
the method comprising
providing a follower which is operatively coupled to at least one of the transmissions such that its position determines transmission ratio,
receiving speed and steering control inputs from a driver,
controlling the follower's circumferential position relative to an axis in dependence upon the steering input, and
controlling the follower's radial distance from the axis in dependence upon the speed input,
wherein movement of the speed control in a first direction causes an increase of the speed of both the left and the right hand vehicle wheels, movement of the speed control in a second direction opposite to the first causes a decrease in the speed of both the left and the right hand vehicle wheels, so that vehicle speed is controllable by means of the speed control, and movement of the steering control causes a change in one ratio relative to the other, to provide for vehicle steering.

In accordance with a third aspect of the present invention there is an arrangement for driving and steering a vehicle having an engine, the arrangement comprising
a right hand transmission which is for transmitting rotary drive between the engine and a right hand driven vehicle wheel at a drive ratio which is continuously variable through a range including forward and reverse ratios,
a left hand transmission which is for transmitting rotary drive between the engine and a left hand driven vehicle wheel at a drive ratio which is continuously variable through a range including forward and reverse ratios,
a driver actuable speed control,
a driver actuable steering control,
and a follower which is movable circumferentially about an axis by means of the steering control and is movable radially with respect to the axis by means of the speed control, the follower being operatively coupled to at least one of the transmissions,
whereby movement of the driver's steering control changes the radius of turn executed by the vehicle and movement of the speed control changes vehicle speed.

The use of independently, continuously variable transmissions allows for steering control through the driven wheels alone.

In accordance with a fourth aspect of the present invention, there is a vehicle having an engine, left and right hand driven wheels, left and right hand transmissions for transmitting rotary drive from the engine to the respective driven vehicle wheels at respective, separately and continuously variable ratios, and a driver actuable control arrangement enabling the driver to control both ratios and thereby to control turning of the vehicle, the vehicle having at least one steerable wheel, and the or each steerable wheel(s) being mounted in the manner of a castor.

Specific embodiments of the present invention will now be described, by way of example only, with reference to the accompanying drawings, in which:—

FIGS. 23 and 24 show the same construction in perspective, from below and above respectively;

Figure 25A:
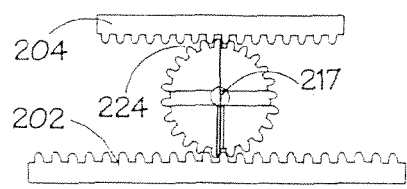
Figure 25B:
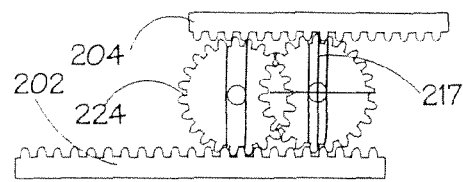
Figure 25C:
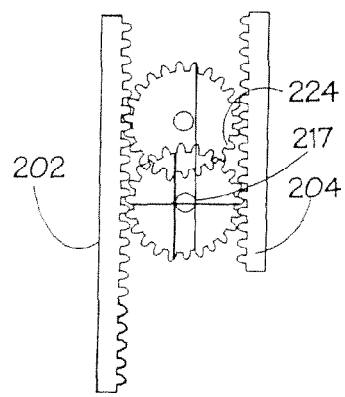
Figure 25D:
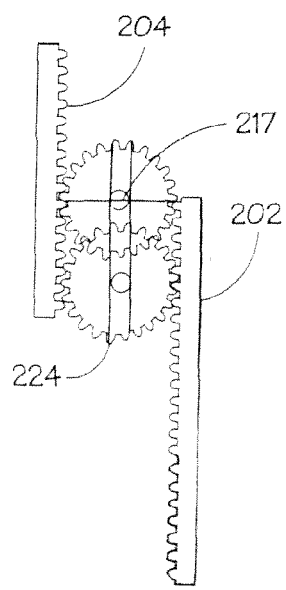
Figure 25E:
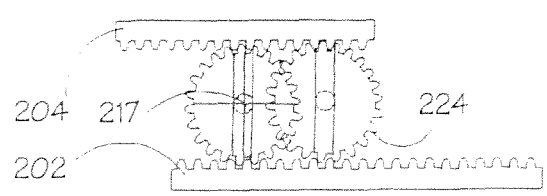
Figure 26:
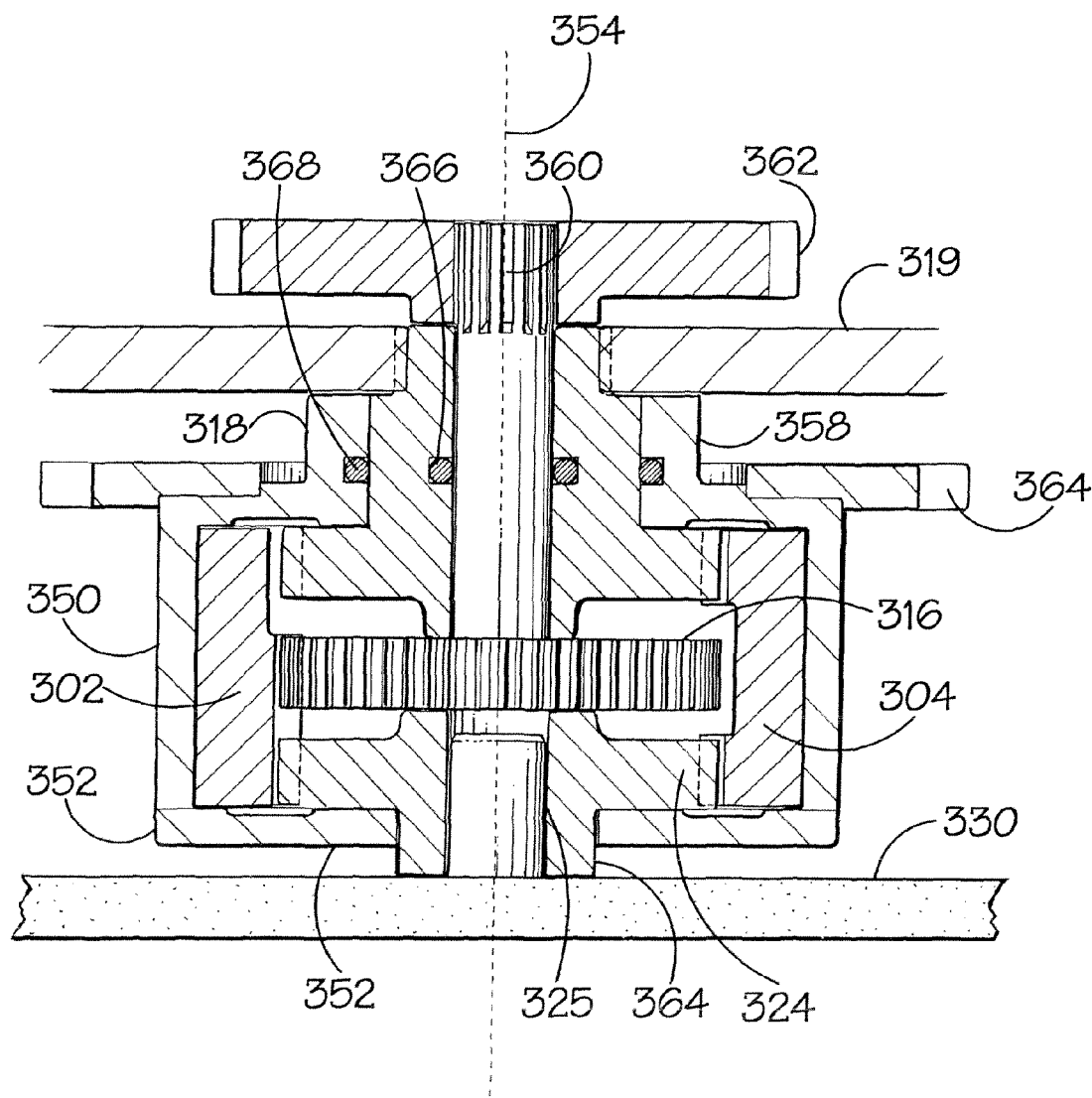
Figure 27:
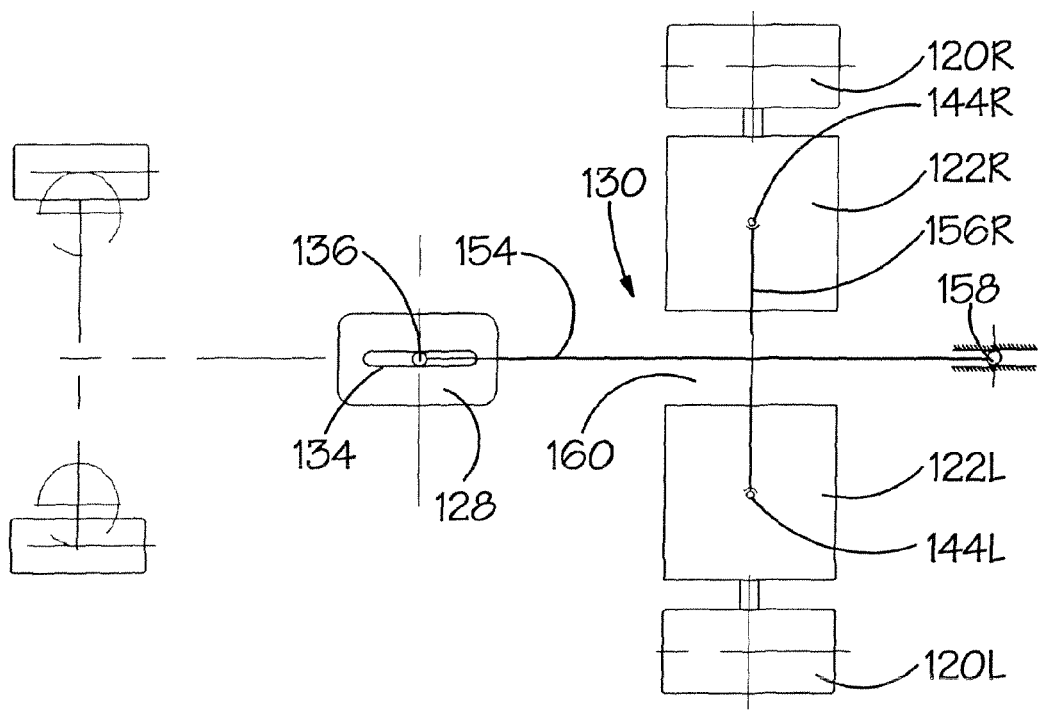

FIGS. 25a-e represent, in highly schematic form, various configurations which this construction can adopt in use; and FIG. 26 is a section through components of a third steering and drive arrangement embodying the present invention;

FIG. 27 is a schematic representation of yet a further steering and drive arrangement in accordance with the present invention;

FIGS. 28 and 29 are respectively plan and side views of parts of still a further steering and drive arrangement embodying the present invention.

FIGS. 2-8 are schematic views, from above, of selected parts of a vehicle embodying the present invention. Left and right hand driven vehicle wheels are seen at 20L and 20R. Each is driven through a respective transmission 22L and 22R of continuously variable type, capable of providing a continuous range of ratios from forward to reverse.

Figure 1A:
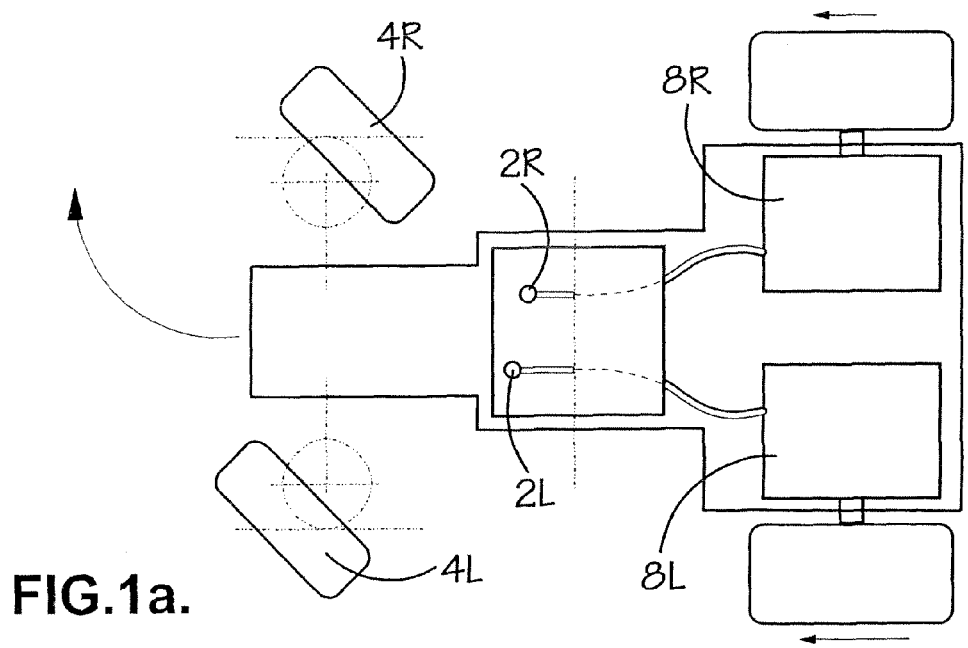
FIGS. 1a-1b illustrate the operation of a known steering arrangement.
Figure 1B:
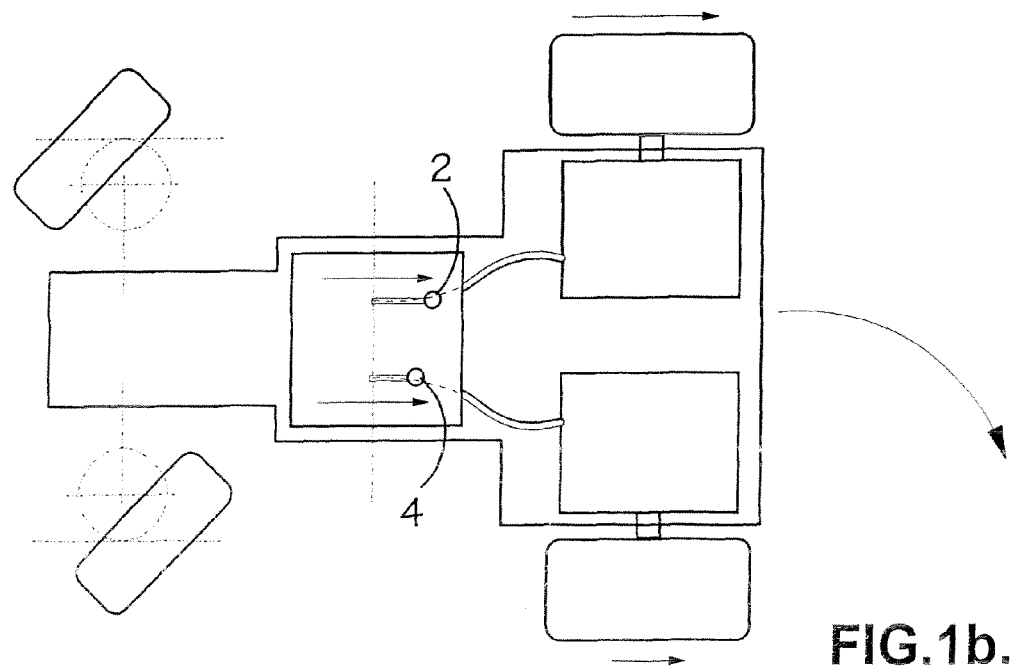
Figure 2:
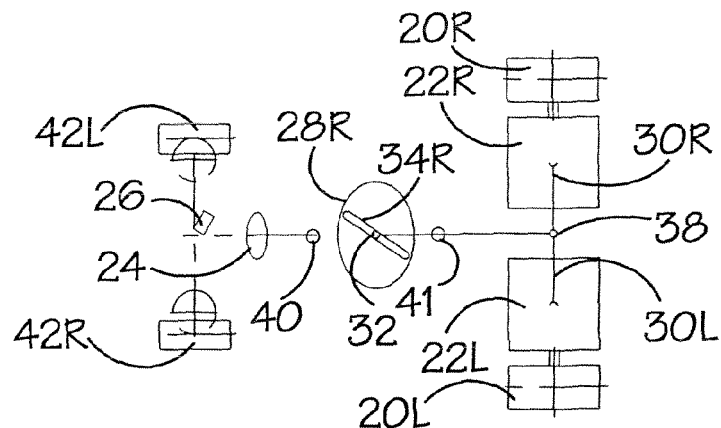
FIGS. 2-8 are highly schematic representations of a first steering and drive arrangement in accordance with the present invention.

The driver dictates the vehicle's speed and direction through two controls, which are represented in schematic form in FIG. 2: a steering control 24, which may take the form of a conventional steering wheel, and a speed control 26, which may be formed as a foot pedal. The pedal is somewhat different from the accelerator control of a motor car, in that it can rocked forwards, using the front of the foot, to select forward drive, or backwards, using the heel, to select reverse. The pedal is sprung toward a central position in which it causes both transmissions 22L, 22R to adopt geared neutral. Other types of user-operable control may of course be used in these roles. Also the two controls could be formed by a single assembly. For example the driver could be provided with a steering bar or wheel which is rotatable to steer and movable fore-and-aft to change speed.

The driver's inputs through the controls 24, 26 determine the ratios adopted by the transmissions 22L, 22R, acting through a mechanism comprising left and right-hand guide plates 28L, 28R and left and right hand actuating levers 30L, 30R. The driver is typically provided with a separate control—e.g. a hand operated lever—for setting engine speed. In vehicles using speed governed diesel engines, the driver typically sets the engine speed with the lever and speed control is subsequently provided by means of the transmissions.

In the present embodiment, the guide plates 28L, 28R are actually placed one above the other, and are mounted for rotation about a common axis 32. Hence in FIG. 2 only right-hand (upper) guide plate 28R is seen. However in FIGS. 3 to 8, for the sake of clarity, the two guide plates are shown side-by-side, which allows both to be seen. The guide plates each define a respective path for guiding a follower. In the illustrated embodiment, the path is simply a straight slot 34L, 34R in the guide plate and the follower 36L, 36R is formed as a pin riding in the slot. Each follower is carried on a respective one of the actuating levers 30L, 30R, and each lever is mounted for rotation about a fixed fulcrum 38. The actuating levers are, in the present embodiment, "L" shaped, the follower being carried upon one limb while the other limb engages with the corresponding transmission 22L or 22R to set its ratio. Lateral movement of the follower 36L or 36R causes lever 30L or 30R to rotate and produces a change in ratio of the relevant transmission 22L or 22R. Consequently the ratios provided by the transmissions 22L, 22R are determined by the lateral positions of the respective followers 36L, 36R.

The guide plates can be moved together forward and backward by means of the driver's speed control 26. The fore-and-aft displacement of the two guide plates is always identical. The guide plates can also be rotated by means of the driver's steering control 24. The two guide plates are not rotated in unison. The movement of the guide plates, and the consequent manner of control of the transmissions, will now be explained with reference to the drawings.

Figure 3:
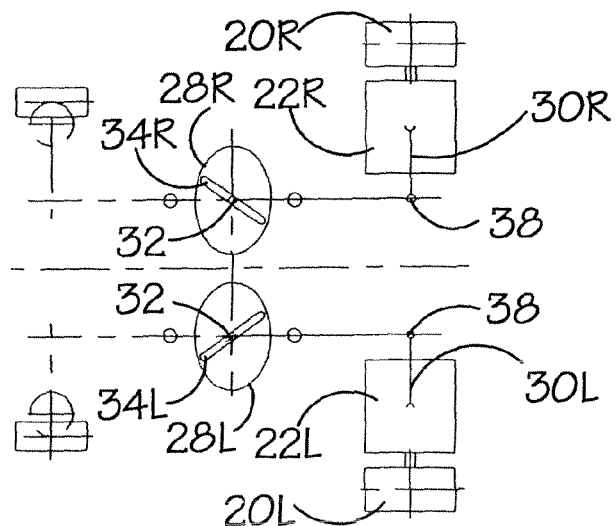

FIG. 3 shows a condition in which the steering control 24 is in its "straight ahead" position—i.e. is set to produce no turn. The two guide plates are in their default orientations, with the guide paths 34L and 34R inclined to the fore-and-aft direction by equal but opposite angles, which in the present embodiment are approximately 45 degrees. The speed control is set to zero indicating a demand for zero wheel movement. This speed control setting causes the guide plates 28L, R to adopt a fore-and-aft position such that the followers 36L, R lie upon the rotational axes 32 of the guide plates 28L, R. This corresponds to positions of the actuating levers 30L, R in which they cause the transmissions 22L, R both to adopt the geared neutral state, in which they provide zero ratio and hence zero output speed, despite rotation of the engine. Because the followers are at the plates' rotational axes, any movement of the steering control cannot move the followers, and so does not cause rotation of the vehicle wheels. This is in accordance with the expectation of the driver, who is used to controlling speed with one control and steering with another.

Figure 4:
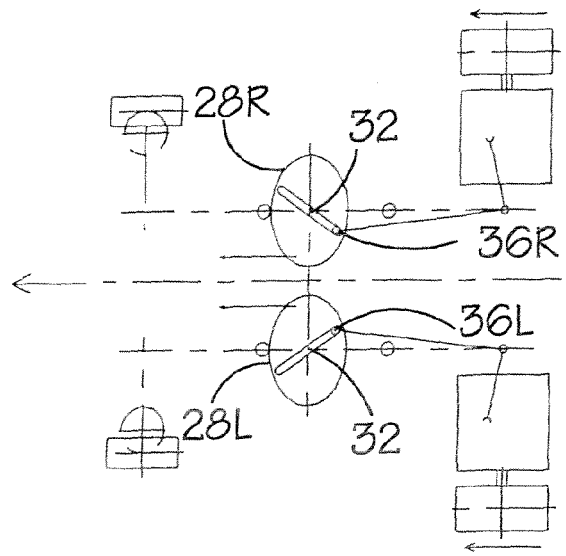

FIG. 4 shows the state of the system when the steering control 24 remains in the "straight ahead" position, but the speed control has been advanced by the driver, to the limit of its travel, to demand maximum forward vehicle speed. The two guide plates 28L, R have been correspondingly advanced which, due to the inclination of their guide paths, has displaced both followers laterally. Correspondingly the actuating levers 30L, R have been rotated, causing the transmissions 22L, R to adopt identical forward drive ratios, driving the vehicle forward in a straight line.

Figure 5:
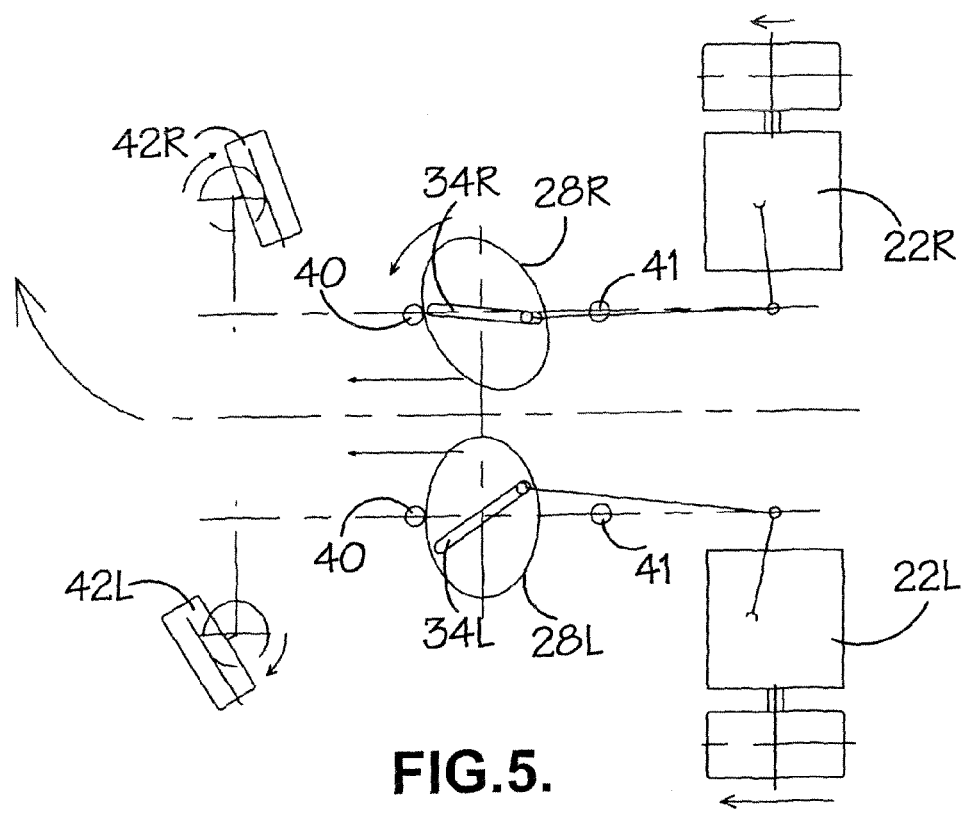

FIG. 5 shows what happens if the driver then turns the steering control to demand a turn to the right. A mechanism (not shown) coupling the steering control to the guide plates 28L, R causes the right hand guide plate 28R to rotate (in an anti-clockwise direction) but leaves the left hand guide plate in its default orientation. The inclination of the path 34R in the right hand guide plate is reduced. Correspondingly the lateral displacement of its follower 36R, and the drive ratio from the associated transmission 22R, are reduced. The right hand wheel is driven more slowly, while the left hand wheel's speed is unchanged, and a right turn results.

Figure 6:
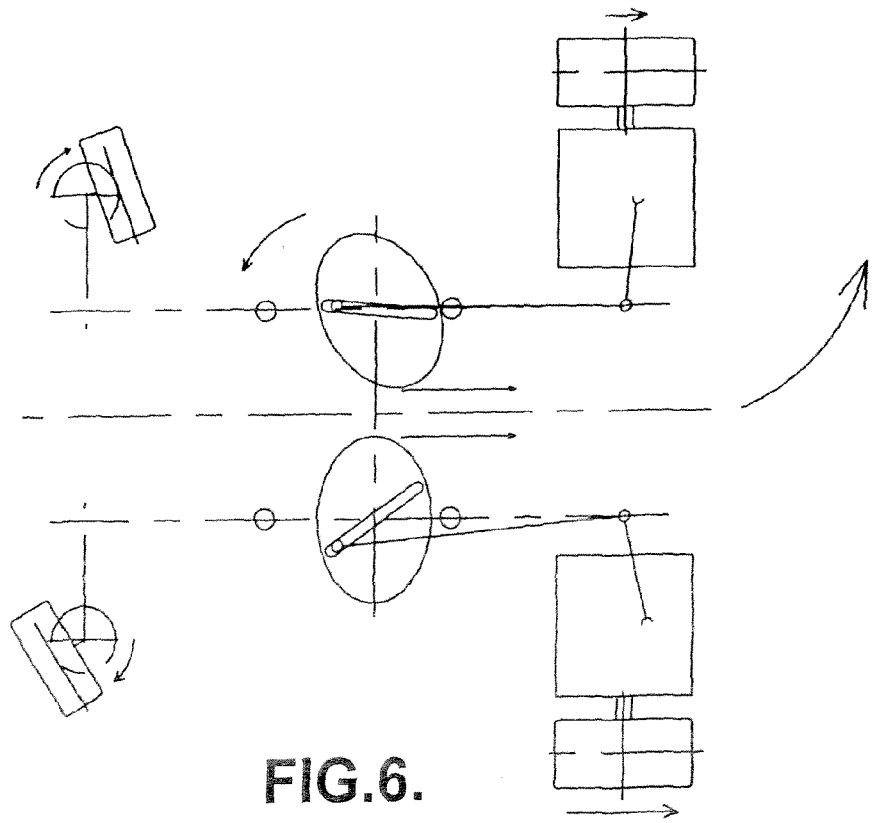

This turn is maintained regardless of the position of the speed control 26. In FIG. 6, the speed control has been moved by the driver to place the vehicle in reverse, while maintaining the setting of the steering control 24. The absolute speed of the right hand wheel remains smaller than that of the left hand wheel, so that the vehicle continues to turn to the right.

Figure 7:
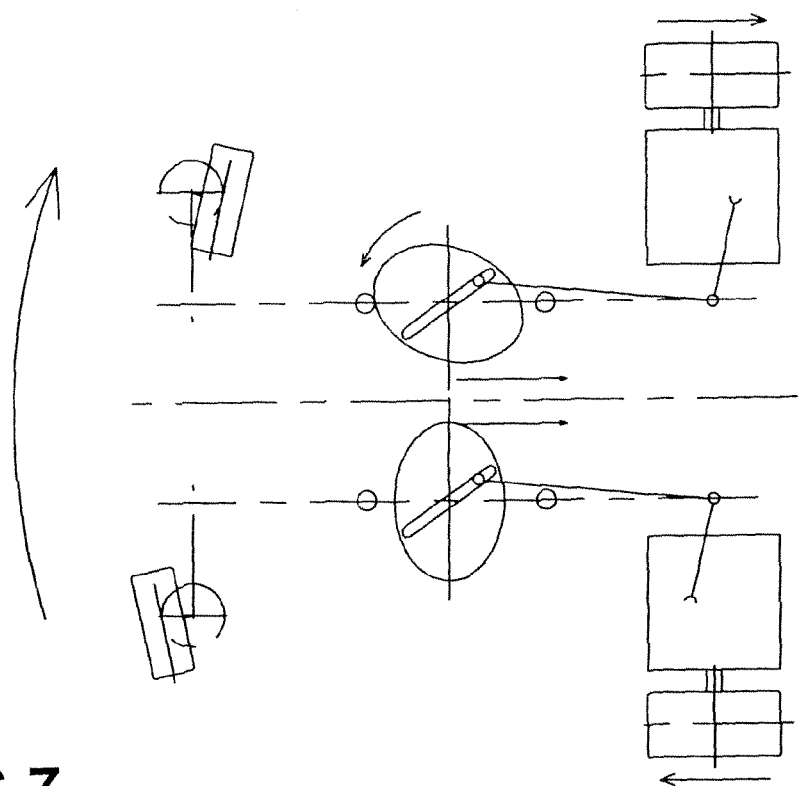
Figure 8:
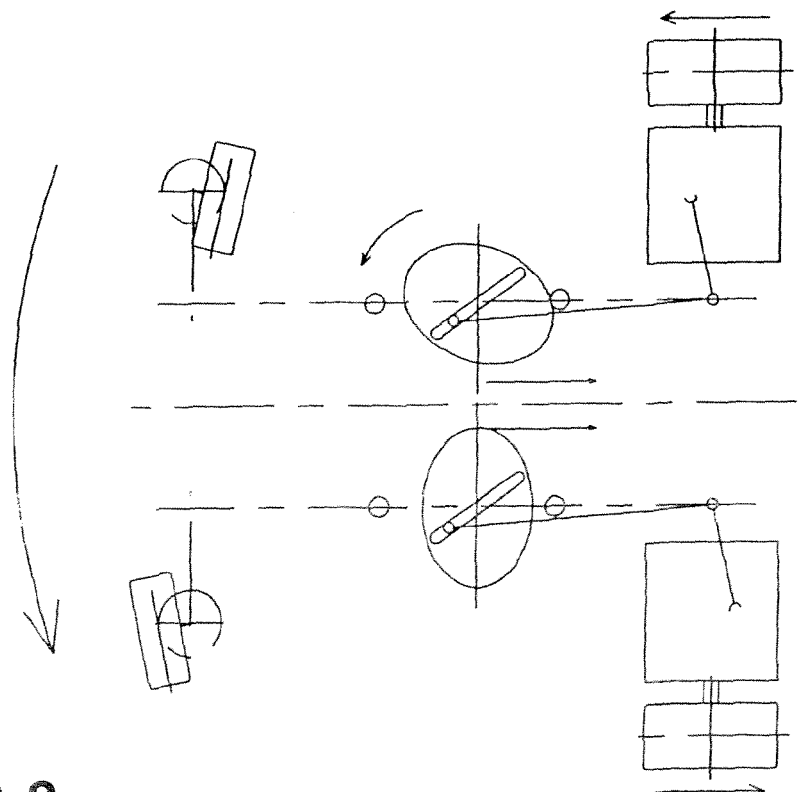

Turning the steering control still further, as in FIG. 7, causes the guide path 34R to rotate beyond the point where it is parallel to the fore-and-aft direction. To put this another way, the angle of inclination of the guide path changes from positive to negative. Correspondingly, the direction of rotation of the right hand wheel is reversed. The two wheels thus rotate in opposite directions, producing a very tight radius of turn or even, where the right and left hand wheel speeds are equal but opposite as in the drawing, causing the vehicle to spin on the spot. With the steering control in this position, moving the speed control from forward to reverse—FIG. 8—changes the direction in which the vehicle spins.

The drawings all show the steering control 24 set either to "straight ahead" or "right turn" positions. However the effect of the control mechanism is symmetrical. If the control is turned to the left of the straight ahead position, then it causes the left hand guide plate 28L to rotate (in a clockwise direction, as viewed) to slow down the left hand wheel, leaving the right hand guide plate in its default orientation.

The effect of this arrangement, as will be apparent, is that the positions of the levers 30L, R controlling the transmissions are each proportional to the speed control setting, but the constant of proportionality is determined by the respective steering control.

The range of ratios which can be demanded from either transmission by movement of the speed control thus depends upon the rotational position of the relevant guide plate 28. Taking account of this, some form of end stop is needed to ensure that the transmissions are not driven beyond their upper and lower ratio limits. In the illustrated embodiment, this is achieved by use of fixed stops 40, 41 in front of and behind the guide plates. Abutment of either guide plate 28L, R against one of the fixed stops limits their fore-and-aft travel, as seen for example in FIG. 7. The guide plate's shape is selected to provide a suitable relationship between their rotational position and their maximum travel. Thus in the illustrated example, the guide plates 28 are elliptical. Their travel is maximised when both are in the "straight ahead" position (FIG. 3) where each ellipse's minor axis is aligned along the fore-and-aft direction. Rotating one of the plates increases its length along this direction and so reduces the distance it can travel without hitting one of the stops. This can mean that as the driver turns the steering control 26, the speed set by control 26 must be reduced—as the driver moves the wheel, the pedal will rise.

The vehicle's front vehicle wheels 42L and 42R could be in the form of castors, being free simply to follow the steering angle dictated by the speeds of the driven wheels, but in the present embodiment are controlled (e.g. through a rack-and-pinion gear, as in conventional steering arrangements) by driver's steering control 24.

Figure 9:
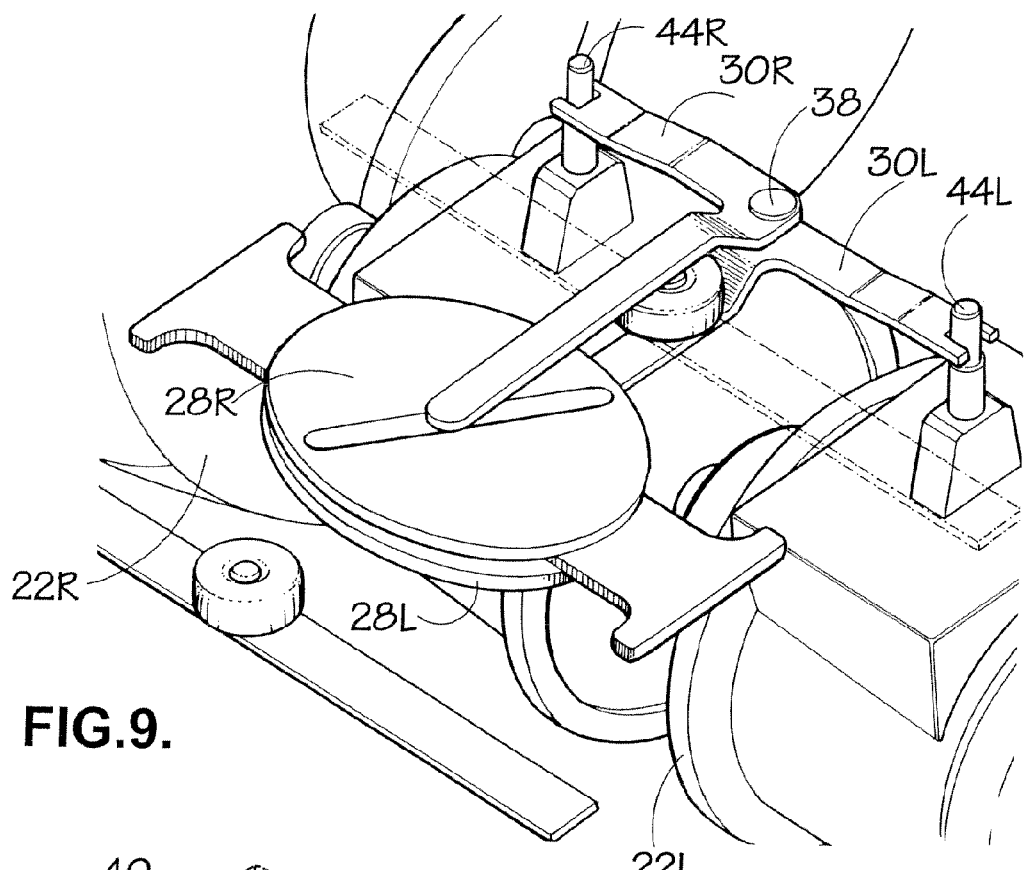
FIGS. 9 and 10 show, in perspective and from above and below respectively, a physical construction of the first arrangement.
Figure 10:
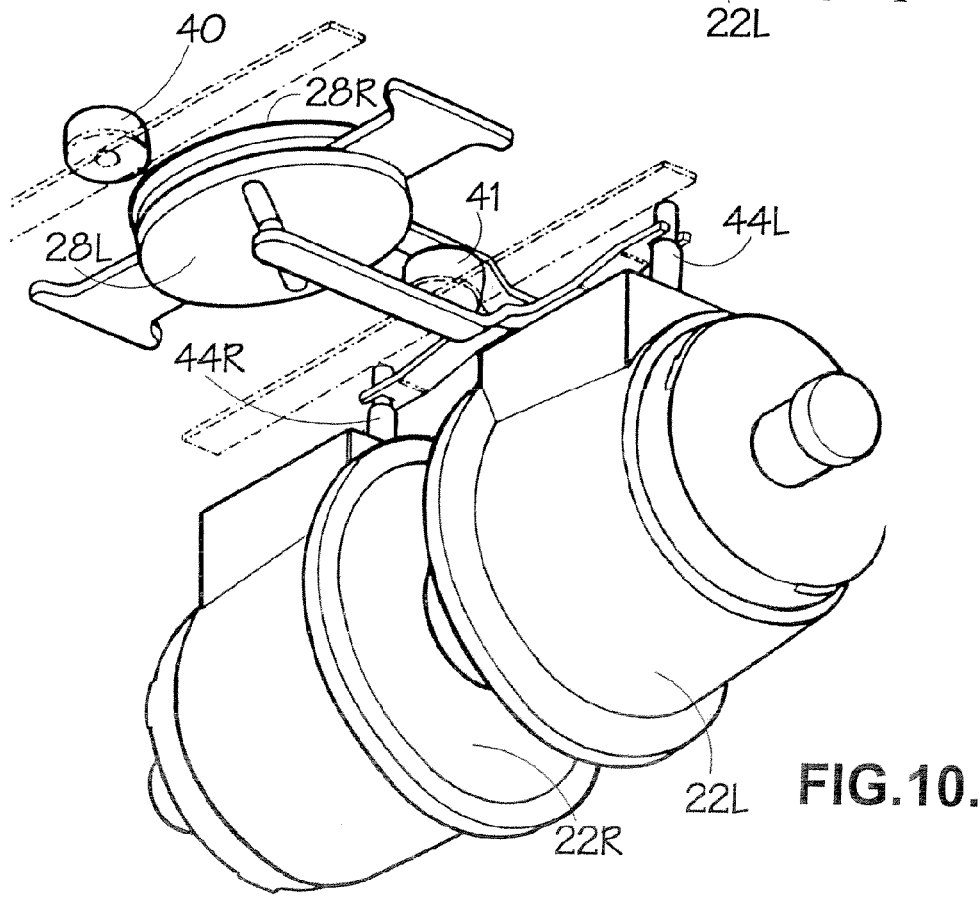

FIGS. 9 and 10 illustrate an actual mechanical embodiment of the control system schematically represented in FIGS. 2 to 8. The left and right hand transmissions are once more seen at 22L and 22R. They each have a projecting ratio-control lever 44L, 44R whose outer end is movable fore-and-aft to change the transmission's ratio. This outer end is located between a parallel pair of tines formed on the actuating lever 30L or 30R, so that the ratio-setting lever's position is determined by that of the actuating lever. The fixed fulcrum about which the actuating levers 30L, R rotate is formed as a pin 38 received in through-going bores in both levers. Other components of the arrangement have already been described and are given the same reference numerals here as in previous drawings.

A possible concern relating to the above-described embodiment is that weighting applied to the steering control by the transmissions may be inappropriate. The driver expects the steering control, when released, to seek its "straight ahead" position. A study of the drawings will confirm that, if the ratio-control lever 44L, R on the inside of the turn seeks its "geared neutral" position, as it does while power flow is from the engine to the relevant wheel, then the steering control is urged away from "straight ahead"—i.e. the turn would tend to tighten, rather than to straighten.

A further embodiment of the present invention, not subject to this disadvantage, will now be described. The principles can best be appreciated by reference to FIGS. 11 to 18. The arrangement is similar to that previously described in that continuously variable transmissions 122L, R are used to drive respective vehicle wheels 120L, R at independent, continuously variable ratios. However in place of the two guide plates of the previous embodiment, the present version has a single guide plate 128 which is rotatable by means of the steering control about a fixed axis indicated by the intersection of dotted lines in the drawings. A follower 136 is received in a guide path formed as a straight slot 134 in the guide plate 128, being thus constrained to move only back and forth along the slot, and this movement is controlled by the speed control. In the present embodiment, the movement is controlled by an opposed pair of Bowdentype control cables leading to the speed control (see FIG. 12). Outer sheathes 150, 152 of the cables are led into bores in opposite end faces of the guide plate 128 and inner cables 151,153 are each coupled to opposite sides of the follower, thus acting in a "pull/pull" manner. Other types of control cable, able to push as well as pull, would make it possible to use a single cable, but there are in any event numerous other mechanisms which could be used to couple the follower 136 to the speed control 126, one of which will be described below.

The follower 136 is mounted upon a fore-and-aft extending limb 154 of a "T" shaped lever 130 having left and right limbs 156L, R which are operatively coupled to the respective transmissions 122L, R such that their fore-and-aft positions dictate the transmissions' ratios. In the drawings, uppermost ends of ratio-control levers of the transmissions are seen at 144L, R and are coupled to the lever's limbs 156L, R. The lever 130 pivots about a fulcrum 158, but this is not fixed. Instead it is able to move along the fore-and-aft direction in a fixed guideway 160. The arrangement is such that the follower's position dictates the positions of the ratio-control levers 144L, R. Moving the follower forward increase both ratios. Moving it backward decreases both ratios. Lateral movement of the follower increases one ratio and decreases the other.

Figure 11:
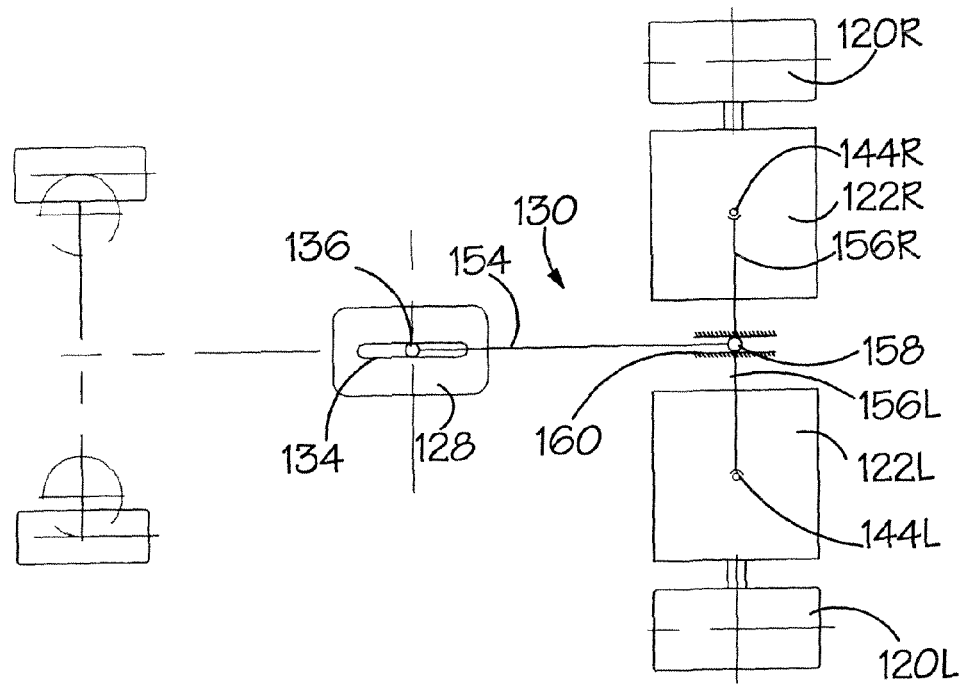
FIGS. 11 and 13-18 are highly schematic representations of a second steering and drive arrangement in accordance with the present invention.
Figure 12:
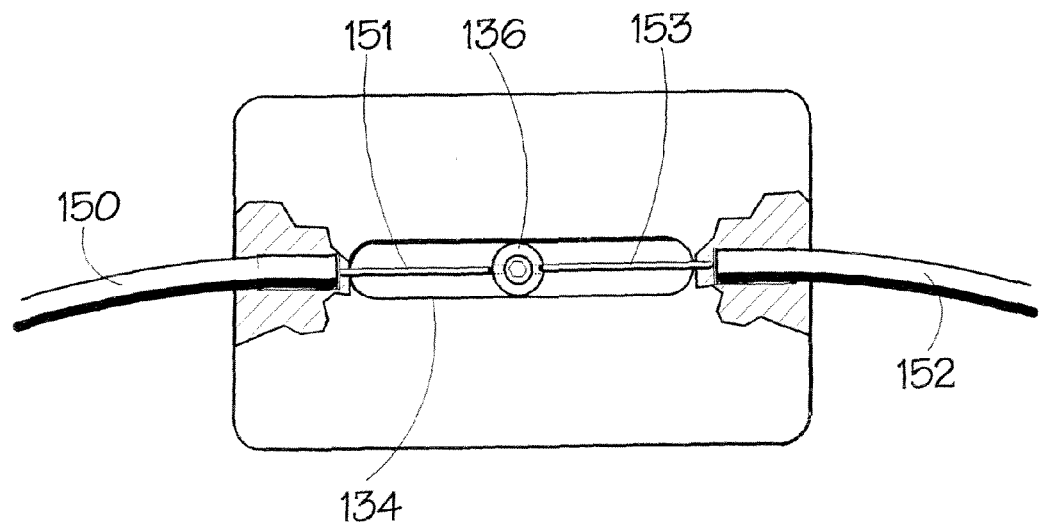
FIG. 12 is a schematic representation of a guide plate used in this arrangement.

The operation of this embodiment will now be described. FIG. 11 shows its configuration when the speed control is set to zero, causing the follower 136 to be positioned on the axis of rotation of the guide plate 128, and the steering control is in the "straight ahead" position, so that the slot 134 is aligned along the fore-and-aft direction. The ratio-control levers are both at their "geared neutral" positions so the vehicle is stationary. Because the follower 136 is on the axis of rotation of the guide plate 128, any rotation of the steering control/guide plate 128 does not move the follower or change the geared neutral ratios of the transmissions, so nothing the driver does with the steering control alone will cause the vehicle to move.

Figure 13:
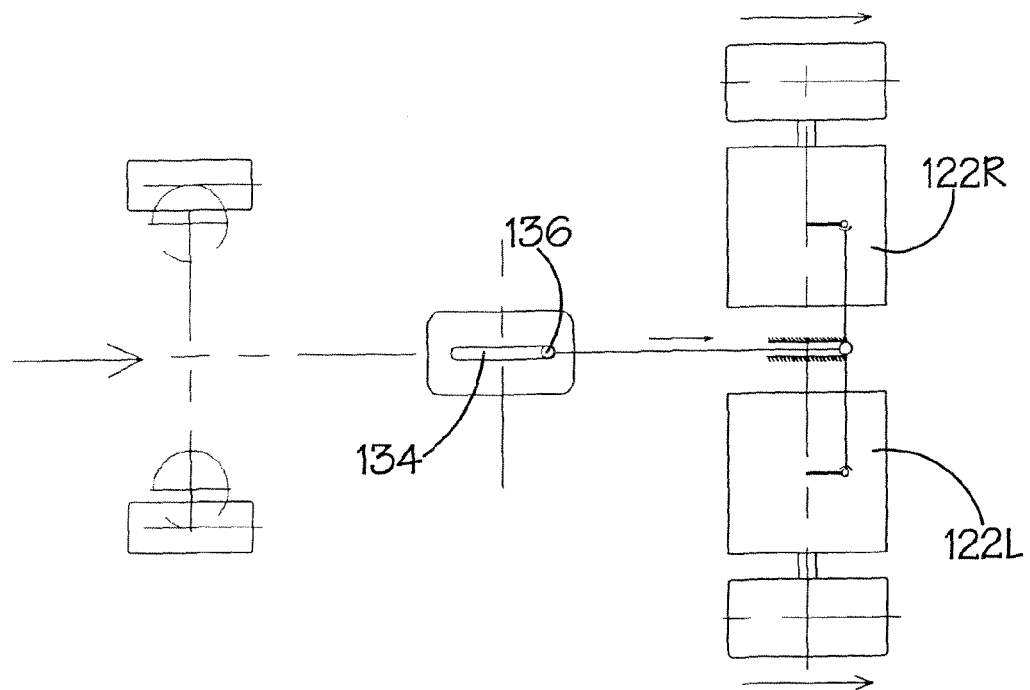
Figure 14:
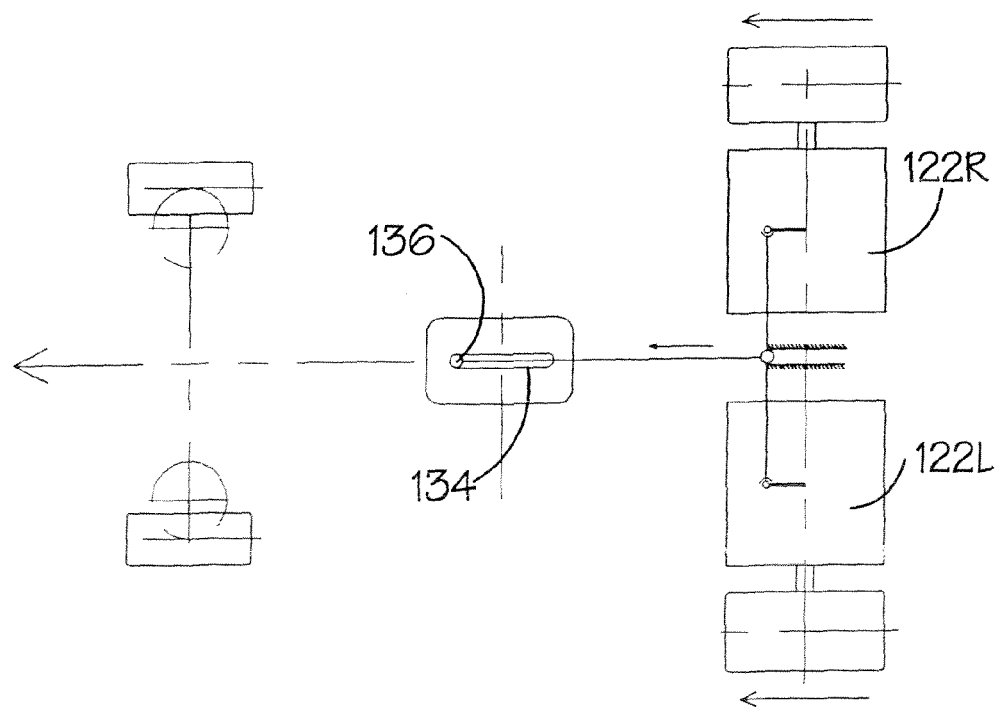

FIGS. 13 and 14 both show configurations in which the steering control 124 is set for "straight ahead". In FIG. 13 the speed control has been moved to request maximum reverse speed, the follower 136 being correspondingly moved to the rear end of the slot 134. Consequently both ratio-control levers are displaced rearwardly by equal amounts, setting both transmissions 122L, R to the same reverse ratio. The vehicle moves backward in a straight line. In FIG. 14, the driver has moved the speed control 126 to request full forward speed, the follower 136 is at the front end of the slot 134 and the transmissions 122L, R are set to identical forward ratios. The vehicle thus moves straight ahead.

Figure 15:
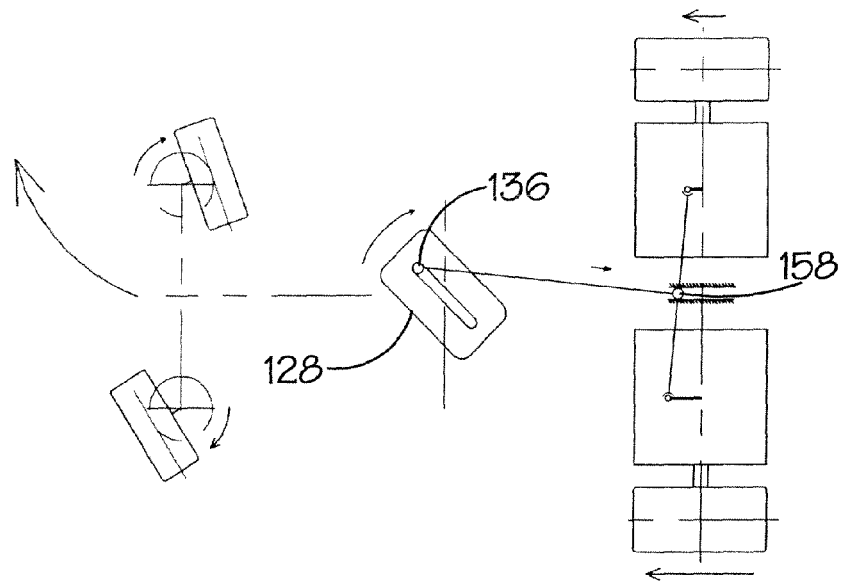
Figure 16:
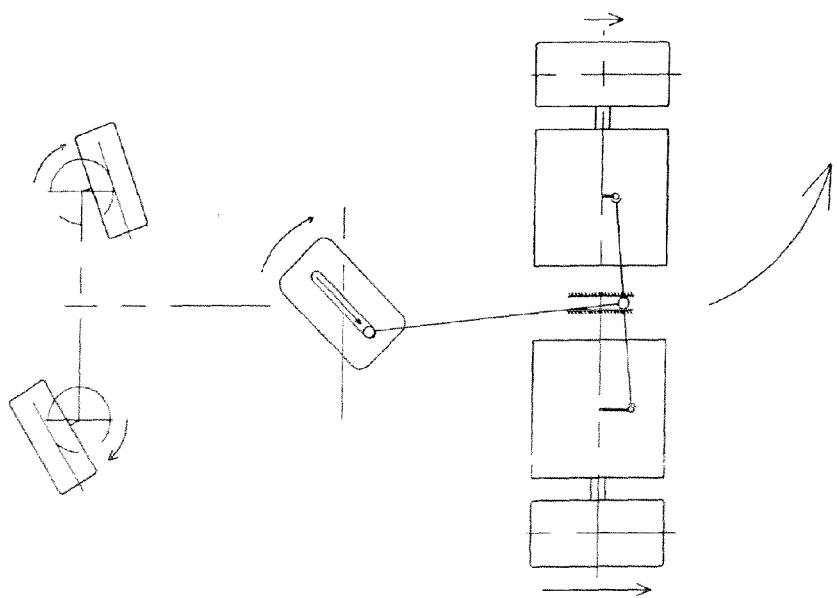

In both of FIGS. 15 and 16, the steering control has been set to require a right turn and the guide plate 128 has been correspondingly rotated (clockwise, as viewed). Due to the lateral displacement of the follower which results from the inclination of the guide slot 134, the lever has pivoted about its fulcrum 158 causing the ratio-control levers 144L, R to adopt different positions. It will be apparent that whether the speed control is set for forward (FIG. 15) or reverse (FIG. 16) the required right turn results.

Figure 17:
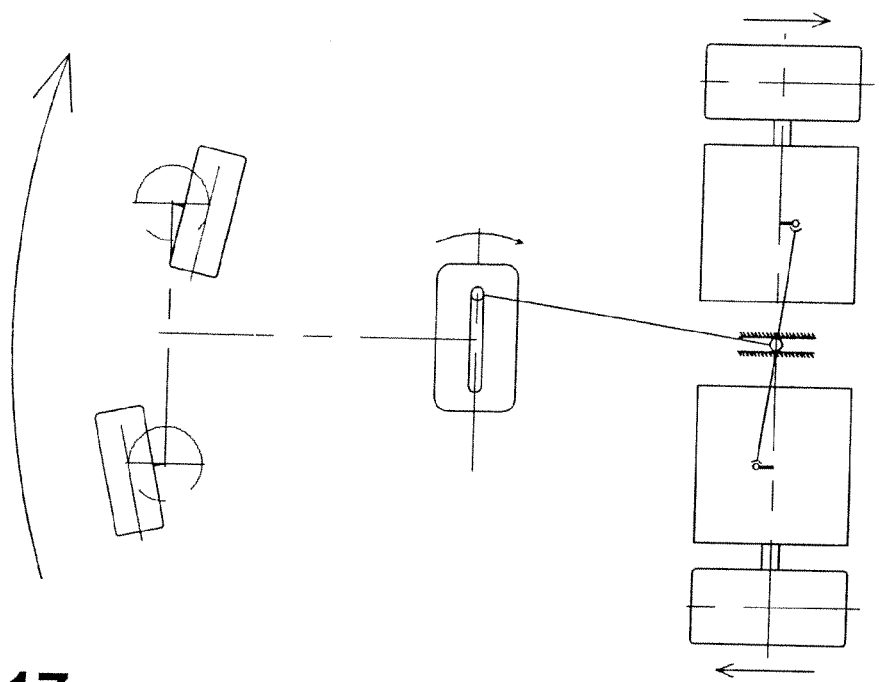
Figure 18:
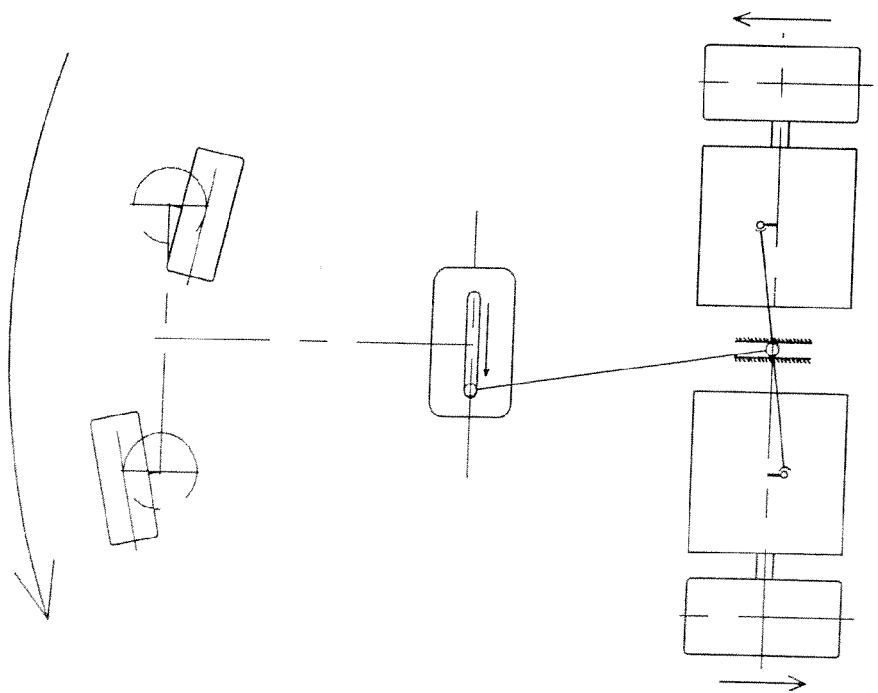

FIGS. 17 and 18 show that, with full lock on the steering control, the vehicle can be made to spin on the spot in either direction, depending on the setting of the speed control 126.

Figure 19:
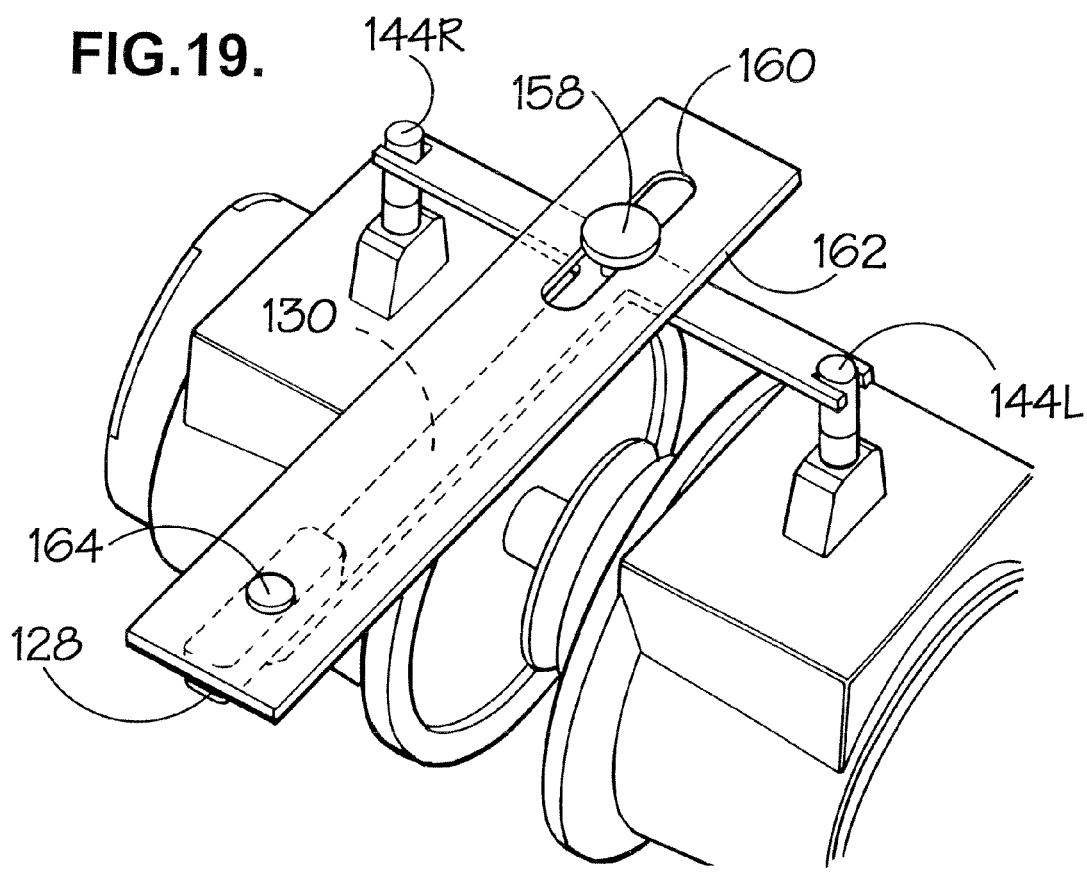
FIGS. 19 and 20 show, in perspective and from above and below respectively, a physical construction of the second arrangement.
Figure 20:
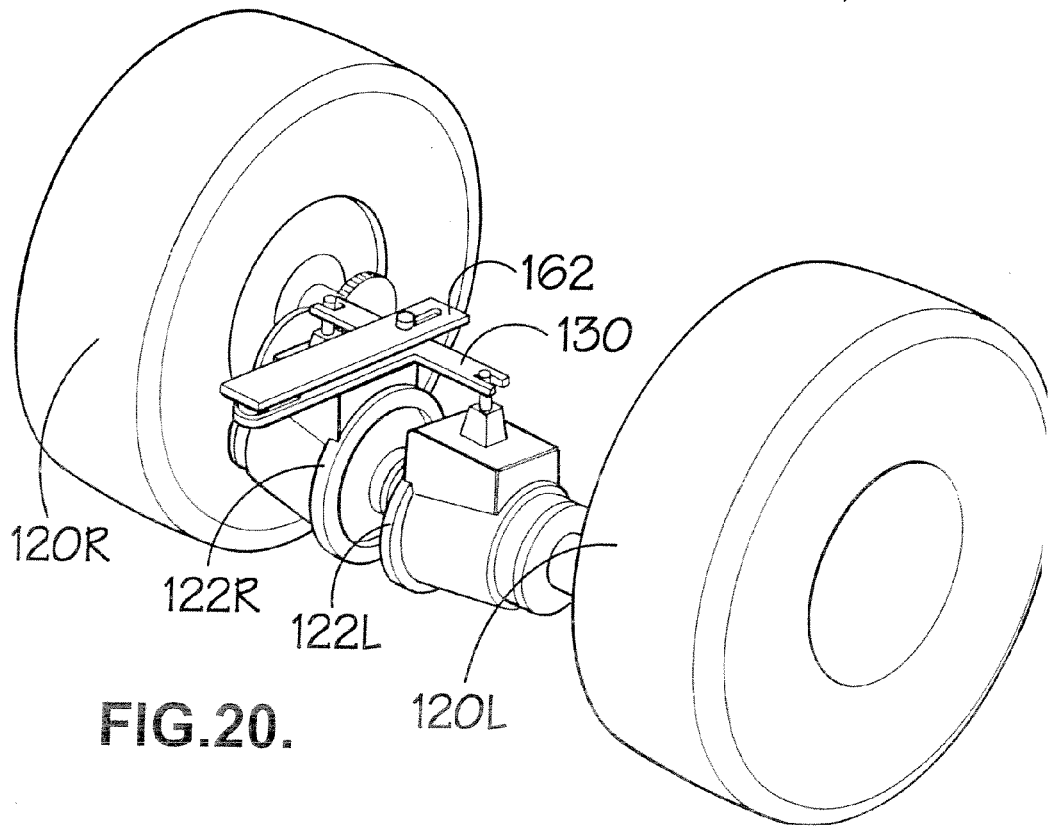
Figure 21:
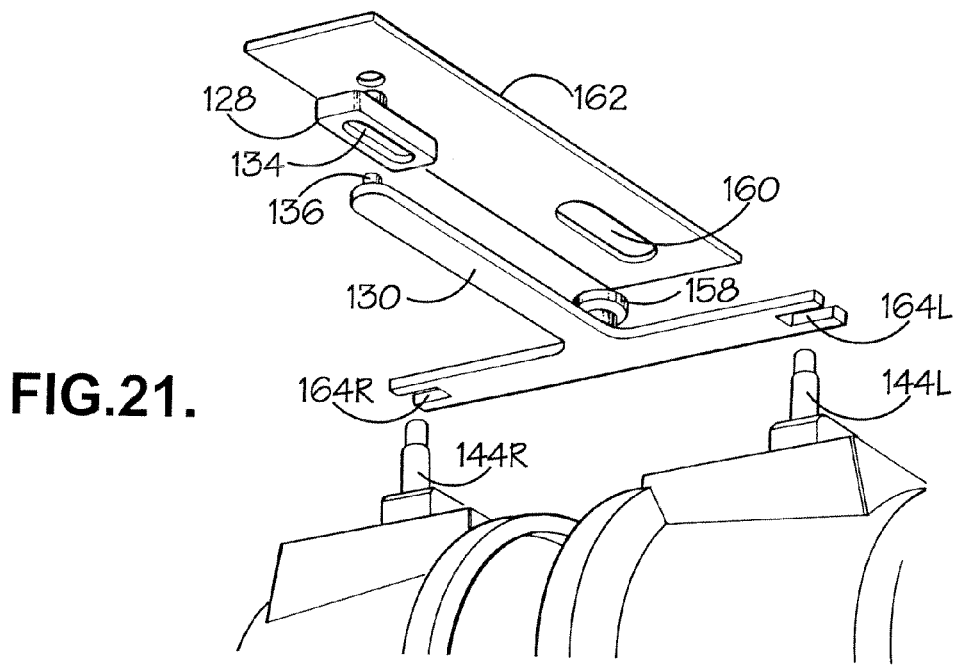
FIG. 21 is an exploded view of this construction.

FIGS. 19 to 21 illustrate one possible construction of this type of arrangement. A mounting plate 162 has a fixed position in the vehicle, and receives a stub axle 164 formed on the upper surface of the guide plate 128 to pivotally mount the guide plate. The follower is formed as a stub 136 on the upper face of the "T" lever 130 running in a downwardly open slot 134 in the guide plate. The Bowden cable arrangement used to move the follower along the slot is omitted from these drawings. The fulcrum 158 is formed as a flanged spigot running in a through-going longitudinal slot in the mounting plate 162 forming the guideway 160. The fulcrum/spigot 158 is screwed to the upper face of the lever 130. Parallel tines 164L, R on the left and right hand limbs of the lever 130 engage the ratio-control levers 144L, R of the transmissions 122L, R.

It was mentioned above that there are alternative mechanisms for controlling the position of the follower along its guide path. FIGS. 22 to 25 illustrate one such alternative mechanism. Compared with the Bowden cable arrangement described above, this has the advantage of providing a positive mechanical connection between the controls and the follower. It uses movable racks to define the guide path and a pinion to form the follower, as will now be explained.

Gear wheel 200 is externally toothed to engage with a mechanism (omitted from the drawings for simplicity) leading to the driver's steering control. This mechanism uses a toothed rack or gear (not shown) movable by means of the steering control. Movement of the steering control by the driver thus rotates the gear wheel 200. Master and slave toothed racks 202, 204 are coupled to the gear wheel 200 such that they turn along with it, but are capable of moving longitudinally relative to it. In the illustrated embodiments, this mounting is achieved through lugs 206, 208 projecting from the gear wheel 200 and received as a sliding fit in longitudinal slots 210, 212 of the respective racks 202, 204. A speed control rack 214 is connected to, and movable along its longitudinal direction by, the driver's speed control, and meshes with a speed control pinion 216. Both the gear wheel 200 and the speed control pinion 216 are journalled on an axle 217 of a mounting pinion 218. The axle 217 is fixed in a mounting plate 219 such that mounting pinion 218 is likewise fixed. The gear wheel 200 has a domed upper region into which the speed control pinion 216 projects, the dome being cut away to enable meshing of the speed control pinion 216 with the speed control rack 214. The mounting pinion 218 meshes with the slave rack 204 but runs in an un-toothed longitudinal recess 220 in the master rack 202, so that it does not restrict longitudinal motion of the master rack. The speed control pinion 216 meshes with the master rack 202, so that displacement of the speed control rack 214 produces a corresponding displacement of the master rack 202.

Follower pinion 224 meshes with lower regions of both master and slave racks 202, 204. It is rotatably mounted on a stub axle 225 carried by a "T" shaped lever 130 of the type already familiar from FIGS. 11-21. The lever is, as before, provided with a fulcrum in the form of a spigot 158 movable along a guideway formed as a slot 160 in the mounting plate 219, and its left and right limbs are coupled to the control levers 144L, R of the transmissions 122L, R. Note that although the follower pinion 224 is shown to be co-axial with the mounting pinion 218 etc. in some of the drawings, it is able to move away from this position in response to input from the driver's speed control.

Hence the longitudinal position of the master rack 202 is controlled by the speed control pinion 216. The longitudinal position of the slave rack 204 is controlled by the mounting pinion 218. Moving the master rack 202 changes the radial position of the follower 224—i.e. its distance from the axis about which the racks turn (which is the axis defined by the axle 217). However, turning the racks causes one of the racks 202, 204 to advance while the other retreats an identical distance, so that the radial position of the follower is unchanged. Hence the operation of this arrangement is analogous to that of the embodiment illustrated in FIGS. 11-21. The racks together form a guide path which is rotatable, about the fixed axis defined by the axle 217, by means of the steering control. The radial position of the follower 224 (i.e. the distance of its centre from the fixed axis) is unchanged by rotation of the guide path and depends only on the position of the speed control rack 214. This will now be illustrated by reference to FIG. 25.

FIG. 25a shows the configuration when the speed control is at zero and the steering control at "straight ahead". The axis of the follower pinion lies on the fixed axis 217, and correspondingly the lever 130 (omitted from FIG. 25 for the sake of representational simplicity) is positioned to place both transmissions in geared neutral.

FIG. 25b shows the configuration where the steering control remains at zero (the orientation of the master and slave racks 202, 204 is the same as in the previous drawing) but the speed control rack 214 (not seen in these drawings) has been advanced, and this motion has been transmitted through the speed control pinion 216 to the master rack 202. Consequently the follower pinion 224 has been displaced forwardly (in a direction from right to left, in the drawings) from the fixed axis 217. As in previous embodiments, the effect of this forward displacement is to set the two transmissions to identical forward ratios, causing the vehicle to move in a straight line.

If the speed control setting of FIG. 25b is maintained, but the driver moves the steering control to request a right turn, the configuration of FIG. 25c is reached. The master and slave racks 202, 204 have turned clockwise through ninety degrees. In the process, both master and slave racks have rotated around their pinions—the fixed pinion controlling the slave rack 204 and the speed control pinion 216 controlling the master rack 202—causing them to move equally and in opposite directions. Consequently the radial displacement of the follower pinion 224 from the fixed axis 217 is unchanged. The follower pinion is now displaced laterally relative to the vehicle (upwardly, as viewed in the drawing) to produce a right turn.

Still maintaining the same speed control setting, but moving the steering control to request a left turn, results in the configuration of FIG. 25d. Compared to FIG. 25b, the racks have turned through ninety degrees anticlockwise. Again the radial displacement of the follower pinion 224 is unchanged.

FIG. 25e shows the configuration when the steering control is set to zero but the speed control rack is withdrawn to move the follower pinion 224 rearward relative to the vehicle (to the right in the drawing), setting both transmissions to identical reverse ratios and causing the vehicle to reverse in a straight line.

It will be apparent that in all of the above described embodiments, the speed control determines the radial distance of the follower or followers 36L, 36R, 136 from the axis about which the guide path 34L, 34R, 134 rotates. The displacement of the follower produced by moving the steering control is a function of this radial distance. Rotating the guide path causes the ratio of one transmission relative to the other to change, whereas moving the follower along the guide path changes both ratios in the same sense.

FIG. 26 illustrates an arrangement which is largely functionally equivalent to that of FIGS. 22-25 but is more convenient in terms of assembly. The arrangement once more has a master rack 302 and a slave rack 304 but in this embodiment the racks are received and mounted by a two part housing 350, 352.

The housing and the racks are able to rotate around axis 354. Mounting pinion 318 is spatially fixed through an integral boss 356 which is splined into mounting plate 319. Housing part 350 has an integral collar 358 through which the housing is rotatably mounted upon the aforementioned boss 356. Running through an axial bore in the mounting pinion 318 is an integral shaft 360 of a speed control pinion 316, the shaft being splined into an upper gear 362 through which speed control is exercised. The upper gear 362 is coupled to the driver's speed control through an arrangement (not shown) using either a chain or a further toothed rack. Rotation of the housing 350, 352 and of the racks it mounts is controlled through a steering gear 364 which is carried upon the housing and coupled to the driver's steering control through an arrangement (not shown) using either a chain or a further toothed rack. A follower pinion 324 receives in an axial bore a stub axle 325 through which is mounted upon and serves to move a "T" shaped lever 330 coupled to the transmissions in the manner hereinbefore described with reference to FIGS. 21-24. The follower pinion 324 meshes with both master and slave racks 302, 304. Speed control pinion 316 meshes only with the master rack 302, so that moving this pinion, by means of the speed control, moves the follower pinion 324 radially. Fixed mounting pinion 318 meshes only with the slave rack 304 to ensure that when the housing rotates, the slave rack retreats to compensate for the advance of the master rack, so that rotation of the housing does not in itself change the radial position of the follower pinion 324.

Assembly of this arrangement involves placing all of the relevant parts in housing part 350, then adding housing part 352 to keep them in place. Note that although it is not apparent from the drawing, the housing 350, 352 forms an elongate enclosure containing the full length of the racks and leaving them room to move longitudinally. Stub axle 325 and a projecting hub 364 surrounding it project through an elongate slot in the housing part 352 to give them freedom to move longitudinally. Seals including "O" ring seals 366, 368 retain lubricant in e housing 350, 352. Mounting the housing assembly on the mounting plate 319 is achieved by inserting the shaft 360 through its hole in the mounting plate and securing the upper gear 362 in place upon the shaft 360 to resist its subsequent withdrawal.

FIG. 27 illustrates a variant of the lever arrangement of FIGS. 11-21. Components are given the same reference numerals in FIG. 27 as in the earlier drawings. In FIGS. 11-21 the movable fulcrum 158 lies on a line joining the ends of the lateral limbs 156L, R of the lever 130—i.e. it lies at the junction of the "T" shape of the lever. However in FIG. 27 the fulcrum 158 is positioned away from this line, on the far side of it from the follower 136. The effect of the change is to modify the relationship between follower position and transmission ratios, and such adjustments to the geometry allow a desired steering characteristic to be achieved.

Steering may be provided solely through the transmissions and the adjustment they provide of the relative speeds of the driven vehicle wheels. In this case other wheels may be arranged to steer themselves in the manner of castors, to follow the radius of turn dictated by the driven wheels. However it is a common practice to provide the vehicle with conventional steerable wheels coupled to the steering control, so that the driven wheels and the steerable wheels work in unison to cause the vehicle to turn. In this case the steering characteristics (steering control position vs vehicle turn radius) of (a) the transmission arrangement and (b) the arrangement controlling the steerable wheels (typically of the type having the well known Ackermann geometry) must be matched if wheel slip is to be avoided. This can in principle be achieved through modification of either arrangement.

FIGS. 28 and 29 show a version of the transmission arrangement designed to match the characteristics of an Ackerman type steering gear. The mechanism seen at 400 is of the same general type seen in FIG. 26, and serves to control the position of a "T" shaped lever 402 which is the equivalent of the lever 130 seen in FIGS. 19-24. Note that in this embodiment the outer ends of this lever couple to the ratio control levers of the variators (which are not seen in this drawing) through spherical heads 403 received in complementarily shaped slots 404, which is a slight modification of the version described earlier. However the major difference of the present arrangement concerns an arrangement of gears 406, 408 through which the mechanism 400 is coupled to the driver's steering control. The gear wheel 406 serves the same purpose as gear wheel 200 seen in FIGS. 22 to 25: it serves to rotate the mechanism 400 and so, by turning the lever 402, to provide the required steering effect. The driver is able to turn the gear wheel 406 by means of the steering control (not seen in this drawing), which is operatively coupled to steering gear 408 which in its turn meshes with the gear wheel 406. Gear wheel 406 and steering gear 408 are non-circular, and their shapes are chosen to provide the required relationship between the position of the driver's steering control and the ratios provided by the two transmissions. The determination of the shapes required for the two gears is a straightforward numerical exercise based upon the characteristic (steering control position vs vehicle turn radius) of the Ackermann steering device and the characteristic (ratio control lever position vs ratio) of the transmissions. In the present embodiment this yields a shape for the gear wheel 206 which has three curved sides, as seen. The gears are shaped to remain in mesh at all times, so that the shape of one determines the shape of the other.

Figure 22:
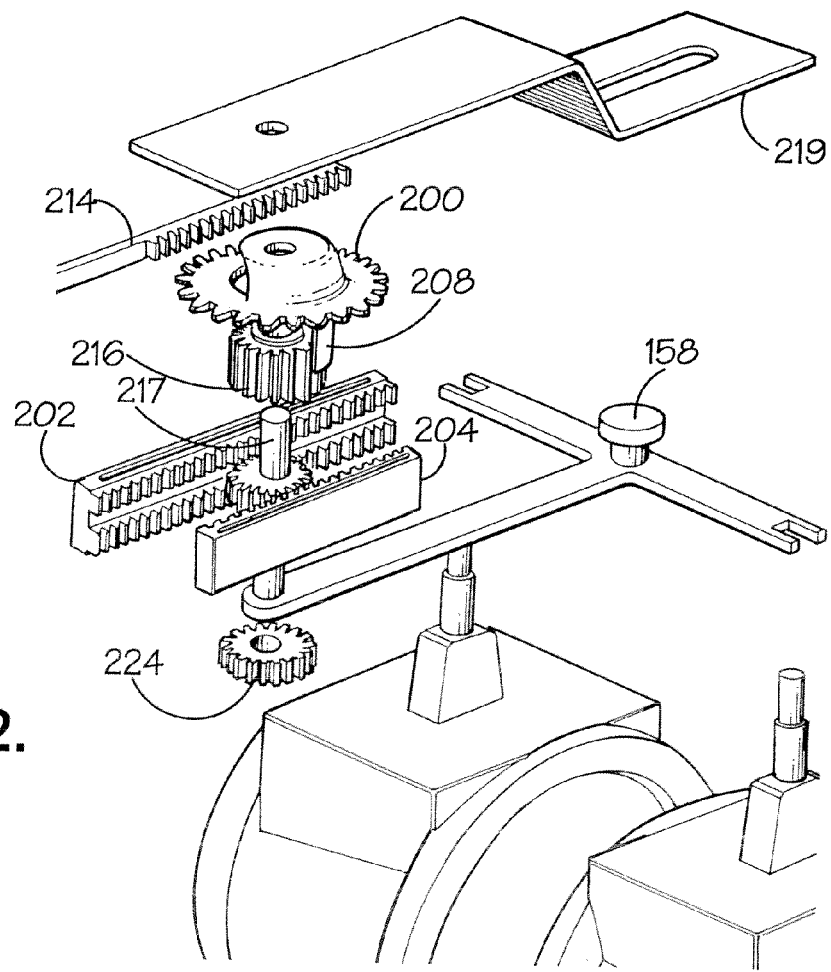
FIG. 22 is an exploded view of an alternative physical construction of the second arrangement.

It is to be understood that the above described embodiments are presented by way of example rather than limitation and numerous possible variations will present themselves to the skilled person. For example, the invention is not necessarily limited to toroidal-race, rolling-traction type transmissions, but could instead be implemented using other types of transmission to vary wheel speed. Hydrostatic or mechanical transmissions would be suitable. The geometry of the control mechanism may be altered to match functional or packaging requirements. For example, the control lever 130 of FIG. 22 is "T" shaped, but in practice a cruciform shape could be chosen, so that the pinion 158 would lie beyond the line forming the ends 164L, 164R of the cross bar of the lever.

The invention claimed is:

1. An arrangement for driving and steering a motorised vehicle, the arrangement comprising:
    a right hand drive arrangement configured to drive a right hand vehicle wheel at a speed which is continuously variable through a range including forward and reverse speeds;
    a left hand drive arrangement configured to drive a left hand vehicle wheel at a speed which is continuously variable through a range including forward and reverse speeds;
    a driver actuable speed control;
    a driver actuable steering control;
    a guide defining a guide path that is rotatable about an axis by means of the steering control; and
    a mechanical follower having a position along the guide path that can be affected by means of the speed control;
    wherein, when the vehicle is steered straight, vehicle speed is controllable by means of the speed control and the left hand drive arrangement is capable of driving the left hand vehicle wheel at a speed equal to the speed at which the right hand drive arrangement is capable of driving the right hand vehicle wheel;
    wherein movement of the steering control causes a change in the speed of one of the left and right hand vehicle wheels relative to the speed of the other.

2. An arrangement as claimed in claim 1, wherein the guide path intersects its own axis of rotation, so that the follower is able to be positioned on the axis, whereupon rotation of the guide path produces no displacement of the follower.

3. An arrangement as claimed in claim 2, comprising a single rotary driver which is coupled through a right hand transmission to the right hand vehicle wheel to form the right hand drive arrangement, and a left hand transmission which is coupled through a left hand transmission to the left hand vehicle wheel to form the left hand drive arrangement, both transmissions providing continuous variation of their respective drive ratios from forward to reverse.

4. An arrangement as claimed in claim 3 wherein the transmissions comprise respective variators of toroidal-race, rolling-traction type.

5. An arrangement as claimed in claim 3 wherein the transmissions comprise respective variators of hydrostatic type.

6. An arrangement as claimed in claim 3 wherein the rotary driver is an internal combustion engine.

7. An arrangement as claimed in claim 3 which is such that when the follower is positioned upon the axis, it causes both transmissions to adopt a geared neutral state which is maintained regardless of the setting of the steering control.

8. An arrangement as claimed in claim 3 wherein the ratio of both transmissions is controlled by means of a common mechanism and the mechanical follower is coupled to the transmissions through respective levers.

9. An arrangement as claimed in claim 8 wherein movement of the follower along a fore-and-aft direction changes the ratios of both transmissions in the same sense.

10. An arrangement as claimed in claim 8 wherein movement of the follower along a lateral direction changes the ratios of the two transmissions in opposite senses.

11. An arrangement as claimed in claim 1 wherein the guide path is defined by a slot or trench in which the mechanical follower is received.

12. An arrangement as claimed in claim 1 wherein the guide path is defined by means of a first toothed rack which is mounted for rotation about the axis and for longitudinal displacement relative to it.

13. An arrangement as claimed in claim 12 comprising a second toothed rack facing the first, the mechanical follower being formed as a follower pinion engaging with both racks.

14. An arrangement as claimed in claim 13 wherein the first toothed rack engages a control pinion which is itself operably coupled to the speed control, whereby rotation of the control pinion produced by means of the speed control causes the first rack to move longitudinally and so changes radial displacement of the follower pinion from the axis, but rotation of the racks about the axis produced by means of the steering control causes the two racks to move longitudinally in opposite directions and leaves the radial displacement of the follower pinion unchanged.

* * * * *